United States Patent
Moriya et al.

(10) Patent No.: US 8,161,944 B2
(45) Date of Patent: Apr. 24, 2012

(54) CONTROL DEVICE OF THE INTERNAL COMBUSTION ENGINE

(75) Inventors: Hidenori Moriya, Susono (JP); Ryo Tadokoro, Okegawa (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 418 days.

(21) Appl. No.: 12/528,353

(22) PCT Filed: Feb. 26, 2008

(86) PCT No.: PCT/JP2008/053232
§ 371 (c)(1),
(2), (4) Date: Aug. 24, 2009

(87) PCT Pub. No.: WO2008/108212
PCT Pub. Date: Sep. 12, 2008

(65) Prior Publication Data
US 2010/0095933 A1 Apr. 22, 2010

(30) Foreign Application Priority Data
Mar. 5, 2007 (JP) ................. 2007-054183

(51) Int. Cl.
*G01M 15/10* (2006.01)
(52) U.S. Cl. .............. 123/435; 123/406.41; 123/406.43; 73/114.69; 73/114.71
(58) Field of Classification Search ............. 123/406.41, 123/406.43, 435; 73/114.69, 114.71
See application file for complete search history.

(56) References Cited

U.S. PATENT DOCUMENTS

| | | | | |
|---|---|---|---|---|
| 6,775,623 | B2 * | 8/2004 | Ali et al. | 702/31 |
| 7,347,185 | B2 * | 3/2008 | Moriya et al. | 123/435 |
| 7,778,766 | B1 * | 8/2010 | Cowgill et al. | 701/108 |
| 7,779,680 | B2 * | 8/2010 | Sasaki et al. | 73/114.71 |
| 2006/0137326 | A1 | 6/2006 | Saito et al. | |
| 2009/0277259 | A1 * | 11/2009 | Sasaki et al. | 73/114.71 |
| 2010/0089363 | A1 * | 4/2010 | Moriya | 123/435 |

FOREIGN PATENT DOCUMENTS

| | | |
|---|---|---|
| JP | 62 53710 | 11/1987 |
| JP | 6 108903 | 4/1994 |
| JP | 7 133742 | 5/1995 |
| JP | 2000 345895 | 12/2000 |
| JP | 2002 47979 | 2/2002 |
| JP | 2002 195071 | 7/2002 |
| JP | 2002 371893 | 12/2002 |
| JP | 2003 148183 | 5/2003 |
| JP | 2004 257258 | 9/2004 |
| JP | 2005 61239 | 3/2005 |
| JP | 2006 144645 | 6/2006 |
| JP | 2006 183511 | 7/2006 |
| JP | 2007 127004 | 5/2007 |

* cited by examiner

*Primary Examiner* — Erick Solis
(74) *Attorney, Agent, or Firm* — Oblon, Spivak, McClelland, Maier & Neustadt, L.L.P.

(57) ABSTRACT

A control device of an internal combustion engine that can accurately estimate an NOx concentration in exhaust gas by using a cylinder internal pressure as basic data. A cylinder internal pressure sensor provided to the internal combustion engine detects a cylinder internal pressure $P_\theta$. An internal energy correlation value ($\Sigma V \cdot dP_\theta/d\theta \cdot \Delta\theta$) having correlation with internal energy consumed in the cylinder is calculated based on the cylinder internal pressure $P_\theta$ and an in-cylinder volume $V_\theta$ ($\theta$ represents a crank angle). The internal energy correlation value is standardized by a load ratio KL, then corrected by a function f(kl) as for a load factor KL so as to calculate an NOx concentration estimated value $[NOx]=\{(\Sigma V \cdot dP_\theta/d\theta \cdot \Delta\theta)/KL\} \times f(kl)$.

16 Claims, 13 Drawing Sheets

Relationship with NOx Quantity $f(KL) = (200-KL)/160$
$f=1$ when $f>1$

NOx Actual Measurement Value

NOx Actual Measurement Value

MFB $\dfrac{\int VdP}{\tau}$ $\begin{pmatrix} \theta 1 = \text{Ignition CA} \\ \theta 2 = \text{Burnout CA} \end{pmatrix}$ NOx Actual Measurement Value

[NOx]
According to
Expression (7)
$\begin{pmatrix} \theta 1 = \text{CApmax} \\ \theta 2 = \text{Expansion BDC} \end{pmatrix}$ NOx Actual Measurement Value

CONTROL DEVICE OF THE INTERNAL COMBUSTION ENGINE

TECHNICAL FIELD

The present invention related to a control device of an internal combustion engine, more specifically to a control device of an internal combustion engine that is preferable to precisely estimate the concentration of NOx included in exhaust gas of an internal combustion engine equipped on a vehicle.

BACKGROUND ART

Conventionally, a system having a function to estimate concentration of NOx included in exhaust gas of an internal combustion engine is known in the art as disclosed by, for example, Japanese Patent Laid-Open No. 2002-195071. More concretely, the above patent document discloses a technique to estimate NOx concentration in the exhaust gas based on intake air quantity, intake air temperature, intake air pressure, air fuel ratio and an EGR (Exhaust Gas Recirculation) ratio.

If the NOx concentration in exhaust gas can be estimated by an calculation, it becomes possible to control an internal combustion engine so that, for example, the NOx concentration does not exceed a permissible value. Because of this, estimating the NOx concentration using the above described technique is useful in order to improve the emission characteristic of the internal combustion engine.
[Patent Document 1]
Japanese Patent Laid-Open No. 2002-195071
[Patent Document 2]
Japanese Patent Laid-Open No. 2000-345895

DISCLOSURE OF THE INVENTION

Problem to be Solved by the Invention

However, the NOx concentration of exhaust gas shows a wide fluctuation responding to a combustion condition of the fuel/air mixture in cylinders. Further, the combustion condition of the fuel/air mixture in the cylinders widely changes due to an ignition timing change, as well as occurrence of knocking. The above described conventional system cannot reflect such a combustion condition change to the estimation of the NOx concentration. In this regard, the above described conventional system still has a room for improving the estimation accuracy of the NOx concentration.

Means for Solving the Problem

The present invention has been made to solve the above mentioned problems and directed to provide a control device of an internal combustion engine that can accurately estimate the NOx concentration in exhaust gas by using a cylinder internal pressure as basic data.

To achieve the above mentioned purpose, the first aspect of the present invention is a control device of an internal combustion engine, comprising:

a cylinder internal pressure sensor detecting a cylinder internal pressure of the internal combustion engine;

internal energy correlation value calculating means for calculating an internal energy correlation value having correlation with internal energy consumed in the cylinder based on the cylinder internal pressure; and NOx concentration estimation means for calculating an NOx concentration estimated value in exhaust gas based on the internal energy correlation value.

The second aspect of the present invention is the control device according to the first aspect of the present invention, further comprising intake air quantity detecting means for detecting an intake air quantity of the internal combustion engine, wherein said NOx concentration estimation means includes:

NOx quantity calculating means for calculating NOx emission quantity exhausted by the internal combustion engine based on the internal energy correlation value; and standardizing means for calculating said NOx concentration estimated value by standardizing said NOx emission quantity with said intake air quantity.

The third aspect of the present invention is the control device of an internal combustion engine according to first or second aspect of the present invention, further comprising intake air quantity detecting means for detecting an intake air quantity of the internal combustion engine, wherein said NOx concentration estimation means includes correction means which corrects said NOx concentration estimated value so as to become lowered as the intake air quantity increases.

The fourth aspect of the present invention is the control device of an internal combustion engine according to any one of first to third aspects of the present invention, further comprising air fuel ratio detecting means for detecting air fuel ratio of air/fuel mixture burning in a cylinder, wherein said NOx concentration estimation means comprises correction means which corrects the NOx concentration estimated value so as to be higher as the air fuel ratio becomes leaner.

The fifth aspect of the present invention is the control device of an internal combustion engine according to any one of first to fourth aspects of the present invention, further comprising residual gas quantity correlation value detecting means for detecting a residual gas quantity correlation value having a correlation with a quantity of residual gas remaining in a cylinder after exhaust stroke, wherein said NOx concentration estimation means comprises correction means which corrects the NOx concentration estimated value so as to be lowered as said residual gas quantity is estimated to be large based on said residual gas quantity correlation value.

The sixth aspect of the present invention is the control device of an internal combustion engine according to fifth aspect of the present invention, further comprising intake air quantity detecting means for detecting an intake air quantity of the internal combustion engine, wherein said correction means corrects said NOx concentration estimated value to be lowered as the sum of said intake air quantity and said residual gas quantity is estimated to be large.

The seventh aspect of the present invention is the control device of an internal combustion engine according to any one of first to sixth aspects of the present invention, further comprising:

control means for controlling the internal combustion engine so that said NOx concentration estimated value approaches an NOx concentration target value; and NOx concentration target value setting means for setting said NOx concentration target value based on driving conditions of the internal combustion engine.

The eighth aspect of the present invention is the control device of an internal combustion engine according to any one of first to seventh aspects of the present invention, further comprising:

power efficiency index mark calculating means for calculating a power efficiency index mark having correlation with power efficiency of the internal combustion engine;

index mark deviation calculating means for calculating the difference between said power efficiency index mark and a power efficiency index mark target value as an index mark deviation;

concentration deviation calculating means for calculating the difference between said NOx concentration estimated value and an NOx concentration target value as a concentration deviation;

evaluation value calculating means for calculating an evaluation value which becomes large as said index mark becomes big and becomes large as said concentration deviation becomes big; and ignition timing control means for controlling an ignition timing of the internal combustion engine so that said evaluation value becomes minimum.

The ninth aspect of the present invention is the control device of an internal combustion engine according to eight aspect of the present invention, wherein said evaluation value calculating means reflects said index mark deviation and the concentration deviation to said evaluation value with the ratios of their respective weighting factors, and said control device further comprises weighting factor changing means for changing said rate of the weighting factors depending on a state of the internal combustion engine.

The tenth aspect of the present invention is the control device of an internal combustion engine according to ninth aspect of the present invention, further comprising:

a catalyst for purifying exhaust gas; and catalyst deterioration judgment means for determining deterioration of the catalyst, wherein said weighting factor changing means includes deterioration countermeasure means for enlarging the ratio of the weighting factor of the concentration deviation when the catalyst is judged to be deteriorated.

The eleventh aspect of the present invention is the control device of an internal combustion engine according to ninth or tenth aspect of the present invention, further comprising:

a catalyst for purifying exhaust gas;

purification available capacity estimation means for estimating NOx purification available capacity of said catalyst;

reproducing means for executing a reproducing treatment to revitalize the NOx purification available capacity of said catalyst; and execution permission-prohibition determining means for determining permission or prohibition of execution of said reproducing treatment, wherein said weighting factor changing means includes reproduce impossibility countermeasure means for enlarging the ratio of the weighting factor of the concentration deviation when said NOx purification available capacity is equal to or less than a judgment value and the execution of said reproducing treatment is prohibited.

The twelfth aspect of the present invention is the control device of an internal combustion engine according to any one of first to seventh aspects of the present invention 1 to 7, further comprising:

power efficiency index mark calculating means for calculating a power efficiency index mark that has correlation with power efficiency of the internal combustion engine;

concentration deviation calculating means for calculating the deviation between the NOx concentration estimated value and the NOx concentration target value as a concentration deviation;

index mark target value setting means for setting a power efficiency index mark target value by correcting a basic target value of said power efficiency index mark based on said concentration deviation; and ignition timing control means for controlling an ignition timing of the internal combustion engine so that said power efficiency index mark approaches said power efficiency index mark target value.

The thirteenth aspect of the present invention is the control device of an internal combustion engine according to any one of first to twelfth aspects of the present invention, further comprising:

a variable valve timing mechanism which can change an opening characteristic of at least one of an intake valve and an exhaust valve so that valve overlap period changes; and control means for controlling said variable valve timing mechanism so that said NOx concentration estimated value approaches an NOx concentration target value.

The fourteenth aspect of the present invention is the control device of an internal combustion engine according to first aspect of the present invention, wherein said internal energy correlation value calculating means includes an MFB calculating means for calculating an MFB as said internal energy correlation value based on said cylinder internal pressure, said MFB indicating a ratio of combustion terminated before arrival of a specific crank angle after the beginning of an expansion stroke.

The fifteenth aspect of the present invention is the control device of an internal combustion engine according to first aspect of the present invention, further comprising a revolution number sensor which detects an engine revolution number, wherein said internal energy correlation value calculating means comprises:

first calculating means for calculating said internal energy correlation value based on a result obtained by integrating a product of an in-cylinder volume and a change rate of the cylinder internal pressure per crank angle during an expansion stroke;

second calculating means for calculating said internal energy correlation value based on the difference between a product of an in-cylinder volume and a cylinder internal pressure obtained shortly after the beginning of an expansion stroke and a product of an in-cylinder volume and a cylinder internal pressure obtained in the vicinity of the end of the expansion stroke; and calculation technique selecting means for selecting the calculation by the first calculating means when the engine revolution number is equal to or less than a judgment value and selecting the calculation by the second calculating means when the engine revolution number excesses the judgment value.

The sixteenth aspect of the present invention is the control device of an internal combustion engine according to first aspect of the present invention, further comprising:

NOx concentration sensor for detecting an NOx concentration in exhaust-gas; and abnormality judgment means for judging an abnormality of said NOx concentration sensor when the difference between the detected value of said NOx concentration and said NOx concentration estimated value exceeds a judgment value.

The seventeenth aspect of the present invention is the control device of an internal combustion engine according to any one of first to sixteenth aspects of the present invention, wherein said internal combustion engine has a plurality of cylinders;

said cylinder internal pressure sensor is provided to each of said plurality of cylinders;

said internal energy correlation value calculating means calculates said internal energy correlation value for each of said plurality of cylinders;

said NOx concentration estimation means calculates said NOx concentration estimated value for each of said plurality of cylinders; and said control device further comprises right or wrong judgment means for judging that the estimated result of the NOx concentration estimated value is right when dispersion of the NOx concentration estimated values calculated for said plurality of cylinders is within a predetermined range.

Advantages of the Invention

According to the first aspect of the present invention, an internal energy correlation value can be calculated based on a cylinder internal pressure of the internal combustion engine. Thus, the NOx concentration shows strong correlation with the internal energy consumed in a cylinder. Accordingly, the present invention can estimate the NOx concentration of exhaust gas accurately.

According to the second aspect of the present invention, it is possible to calculate an NOx exhausted quantity based on the internal energy. The larger the combustion gas quantity, inevitably the more the NOx exhausted quantity. The present invention can accurately calculate the NOx concentration by standardizing the NOx exhausted quantity with an intake air quantity.

According to the third aspect of the present invention, it is possible to correct the NOx concentration estimated value to be lowered as the intake air quantity increases. The internal energy increases so as to be proposal to the increase of intake air quantity in a region where the intake air quantity is small. However, the rate of increase of the internal energy to the increase of the intake air quantity becomes gentle in a region where the intake air quantity is large, since percentage of lost energy due to heat radiation becomes large. As a result, produced NOx quantity compare to an intake air quantity becomes comparatively small in the region where the intake air quantity is large. The present invention can accurately estimate the NOx concentration regardless large or small of the intake air amount by compensating the effect.

According to the fourth aspect of the present invention, the leaner the air fuel ratio is, the higher the NOx concentration estimated value can be corrected. The leaner the air fuel ratio, i.e., the more the oxygen amount in the air fuel mixture, the easier the NOx to be produced. The present invention can accurately estimate the NOx concentration regardless high or low of the air fuel ratio by compensating the effect.

According to the fifth aspect of the present invention, the more the quantity of residual gas existing in the cylinder after an expansion stroke, the lower the NOx concentration estimated value can be corrected to. The more the residual gas quantity, the more difficult arising the temperature of the combustion gas, since energy produced in the cylinder is absorbed by the residual gas. Thus, NOx concentration is apt to be low as the residual gas increases. The present invention can accurately estimate the NOx concentration regardless large or small of the residual gas by compensating the effect.

According to the sixth aspect of the present invention, it is possible to correct the NOx estimated value to be lowered as the sum of the intake air quantity and the residual gas quantity increases. Thus, the present invention can appropriately reflect both of the effect of the intake air quantity and the effect of the residual gas to the NOx concentration.

According to the seventh aspect of the present invention, it is possible to control the internal combustion engine so that the NOx concentration estimated value approaches to the NOx concentration target value. Further, the present invention can change the NOx concentration target value based on driving condition of the internal combustion engine. The present invention, therefore, can satisfy the requirement to the internal combustion engine with high degrees of freedom while appropriately controlling the NOx concentration.

According to the eighth aspect of the present invention, it is possible to calculate the evaluation value so as to be enlarged as the difference between the power efficiency index mark and the target value thereof becomes large, and the difference between the NOx concentration estimated value and the target value thereof (the concentration deviation) becomes large. Further, the present invention can control the ignition timing so that the evaluation value becomes minimum. The evaluation value decreases as both of the power efficiency and the NOx estimated value approach to their respective target value. Thus, the present invention can operate the internal combustion engine while optimizing both of the power efficiency and the NOx concentration estimated value.

According to the ninth aspect of the present invention, the index mark deviation which represents the difference between the power efficiency and the target thereof and the concentration deviation can be reflected to the evaluation value with the ratios of their respective weighting factors. Further, the present invention can vary the ratios of the weighting factors. Because of this, the present invention can change the condition of the internal combustion engine from a condition in which greater importance is given to the power efficiency until a condition in which greater importance is given to the NOx concentration.

According to the tenth aspect of the present invention, it is possible to implement a setting by which greater importance is given to the NOx concentration when the catalyst is judged to be deteriorated. According to such a setting, an exhausted quantity of NOx can be sufficiently suppressed even under a situation in which the catalyst is deteriorated.

According to the eleventh aspect of the present invention, the NOx purification available capacity of the catalyst can be reproduced by the execution of the reproducing treatment. However, reproduction cannot be achieved when the reproduction treatment cannot be executed. The present invention can implement a setting by which greater importance is given to the NOx concentration under such a situation. According to such a setting, the exhausted quantity of NOx exhausted before the execution of the reproduction treatment is allowed can be sufficiently suppressed, since the amount of NOx to be purified by the catalyst decreases.

According to the twelfth aspect of the present invention, it is possible to correct the basic target value of the power efficiency index mark based on the difference between the NOx concentration estimated value and the target value thereof (concentration deviation). Further, the present invention can control the ignition timing so that the power efficiency index mark approaches of the internal combustion engine approaches the corrected power efficiency index mark target value. Thus, according to the present invention, it is possible to operate the internal combustion engine with the optimized power efficiency and the optimized NOx concentration.

According to the thirteenth aspect of the present invention, it is possible to vary the valve overlap by actuating the variable valve timing mechanism so that the residual gas quantity in the cylinder varies. The residual gas quantity has effect on the NOx concentration. The present invention can control the variable valve timing mechanism so that the NOx concentration estimated value approaches the target value thereof by utilizing the above characteristic.

According to the fourteenth aspect of the present invention, it is possible to calculate an NOx concentration estimated value based on an MFB, which is calculated as the internal energy correlation value. Thus, the present invention can easily calculate the NOx concentration estimated value.

According to the fifteenth aspect of the present invention, it is possible to calculate an internal energy correlation value by a first calculation technique using an integration calculation as well as a second calculation technique accompanying a low calculation load. In the present invention, the first calculation technique accompanying a high calculation load is employed only in a low engine revolution number region, whereas the second calculation technique is used in a high engine revolution number region. Thus, the present invention can calculate an NOx concentration estimated value with a high precision in the low revolution region while preventing a too heavy calculation load from arising in the high revolution region.

According to the sixteenth aspect of the present invention, it is possible to accurately judge an abnormality of the NOx concentration sensor by judging whether a detected value of NOx concentration is far away from the NOx concentration estimated value.

According to the seventeenth aspect of the present invention, it is possible to judge whether the NOx concentration estimated value is right or wrong by comparing NOx concentration estimated values that are calculated for the plurality of cylinders.

Figure 1:
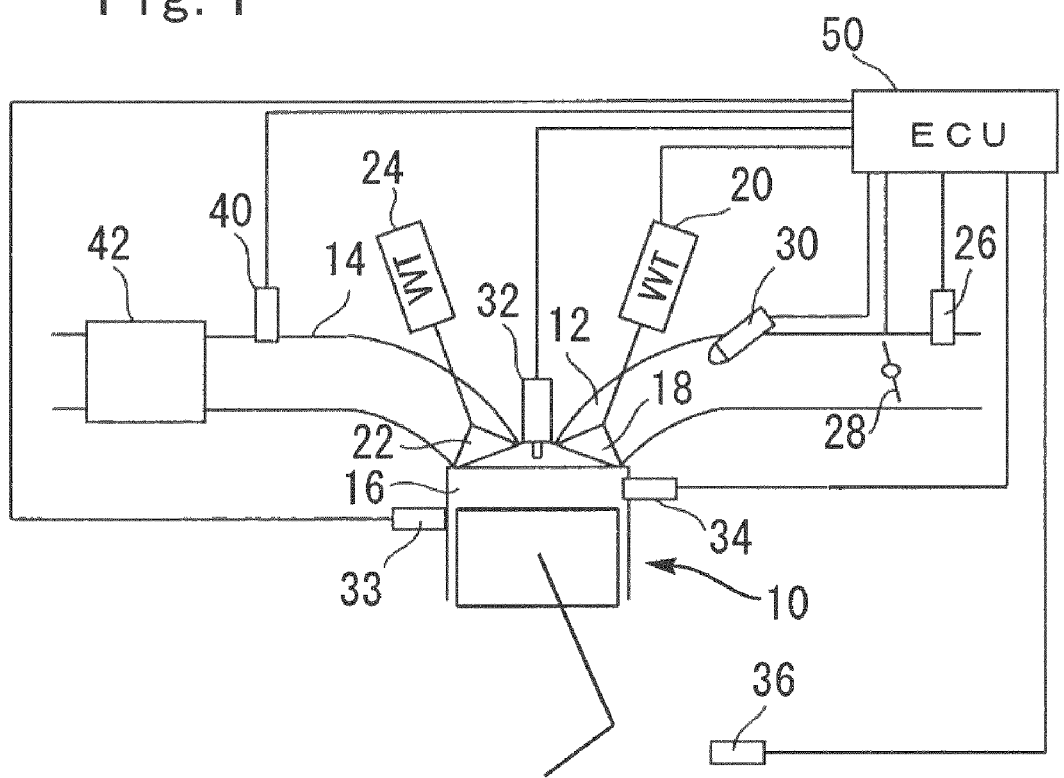
FIG. 1 is a diagram for explaining the configuration of a system according to a first embodiment of the present invention.

DESCRIPTION OF REFERENCE NUMERALS 10 internal combustion engine;
18 intake valve
22 exhaust valve
20 intake side VVT
26 air flow meter
34 cylinder internal pressure sensor
36 crank angle sensor
50 ECU (Electronic Control Unit)
90 NOx sensor
$V_\theta$ cylinder internal volume
$P_\theta$ cylinder internal pressure
KL load ratio
Pm intake air pipe pressure
SA ignition advance value
$\tau$ fuel injection time
NE engine revolution number Ga intake air quantity
CApmax maximum cylinder internal pressure crank angle

BEST MODE FOR CARRYING OUT THE INVENTION

First Embodiment

[Description of System Configuration]

FIG. 1 is a diagram for explaining the configuration of a system according to a first embodiment of the present invention. The system according to the present embodiment has an internal combustion engine 10. The internal combustion engine 10 is a multiple cylinder type engine that includes a plurality of cylinders. In FIG. 1, one of the cylinders is shown as a representative example.

The individual cylinder of the internal combustion engine 10 communicates with an intake path 12 and an exhaust path 14. An intake valve 18 is installed at the boundary between the intake path 12 and the cylinder inside 16. The intake valve 18 is driven by a variable valve timing mechanism (VVT) 20. The variable valve timing mechanism 20 can change an opening timing of the intake valve 18. An exhaust valve 22 is installed at the boundary between the exhaust path 14 and the cylinder inside 16. The exhaust valve 22 is driven by a VVT 24 having the same function as that of the VVT 20.

The intake path 12 is provided with an air flow meter 26 for detecting an intake air quantity Ga. The air flow meter 26 is installed at upstream side of a throttle valve 28. Further, an intake port that communicates with the individual cylinder is equipped with an injector 30. Furthermore, the individual cylinder is provided with an ignition plug 32 and cylinder internal pressure sensor 34.

The internal combustion engine 10 has a crank angle sensor 36 for detecting a crank angle. The cylinder block of the internal combustion engine 10 is provided with a water temperature sensor 38 for detecting a cooling water temperature THW. The exhaust path 14 has an air fuel ratio sensor 40 for detecting an exhaust air fuel ratio. The air fuel sensor 40 is arranged at upstream side of a catalyst 42 for purifying exhaust gas.

The system according to the present embodiment includes an ECU (Electronic Control Unit) 50. The ECU 50 is connected to various sensors and actuators. The ECU50 is capable of controlling the condition of the internal combustion engine 10 adequately based on the signals transmitted from those sensors.

[Feature of First Embodiment]

The system according to the present embodiment has a function for calculating a NOx concentration estimated value [NOx] of the exhaust gas based on the output of the cylinder internal pressure sensor 34. As follows, the technique by which the system according to the present embodiment calculates the NOx concentration estimated value [NOx] will be described.

The energy generated in the cylinder of the internal combustion engine 10 is mainly converted into working energy Qw that is converted into the output torque and internal energy Qi that is consumed in the cylinder (i.e., energy for elevating the gas temperature in the cylinder). The NOx in the exhaust gas is apt to be generated when the gas in the cylinder is overheated during an expansion process. Thus, the generated NOx quantity correlates with the internal energy generated in the cylinder.

The internal energy that is generated as the fuel/air mixture burns can be calculated by the following expression. It should be noted that $V_\theta$ and $P_\theta$ mean cylinder volume V and cylinder internal pressure P at a crank angle $\theta$, respectively. Further, the integration period of the following expression is defined to a period from the ignition crank angle $\theta_1$ to the burnout crank angle $\theta_2$.

$$Qi = \int V_\theta (dP_\theta/d\theta) d\theta \qquad (1)$$

The air fuel ratio in the internal combustion engine 10 is principally controlled to a theoretical mixture ratio. Under such a premise, the potential energy of the fuel/air mixture is proportional to the intake air quantity Ga (i.e., load ratio KL). Thus, the internal energy generated in the cylinder and the NOx quantity generated in the cylinder are both proportional to the intake air quantity Ga (load ratio KL). Accordingly, the NOx concentration estimated value [NOx] of exhaust gas shows correlation for the value that is obtained by standardizing the internal energy calculated by the expression (1) with the KL. The following expression shows the relationship discussed above. It should be noted that α in the following expression is a proportionality coefficient.

$$[NOx] = \alpha \cdot Qi / KL \qquad (2)$$
$$= \alpha \cdot \left\{ \int V_\theta (dP_\theta/d\theta) d\theta \right\} / KL$$

Figure 2:
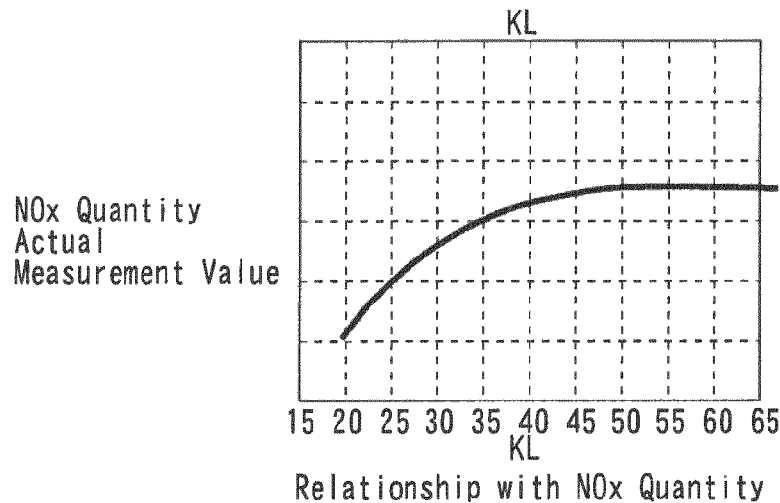
FIG. 2 is a drawing which shows a relationship between a load ratio of an internal combustion engine and an actual measurement value of NOx emission quantity.

FIG. 2 is a drawing which shows a relationship between a load ratio KL of the internal combustion engine 10 and an actual measurement value of the NOx emission quantity. In the above described expression (1), it is assumed that the internal energy Qi is proportional to the load ratio KL. However, when the load ratio KL becomes large so as to enlarge the in-cylinder generated energy quantity, the percentage of energy loosed due to radiation through the wall surface or the like becomes large, whereby the increasing rate of the internal energy with the increase of the load ratio KL becomes gentle. The result shown in FIG. 2 is one to which the above described phenomenon is reflected, and showing that NOx emission quantity is substantially proportional to the KL until the load ratio reaches up to forty and the increasing rate of the NOx emission quantity becomes gentler and gentler as the load ratio KL becomes large in the region in which the load ratio exceeds forty.

Figure 3:
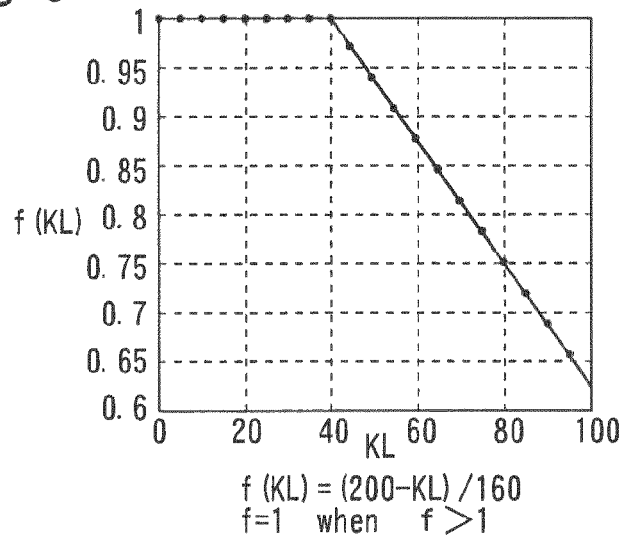
FIG. 3 is a drawing to explain an example of a correct coefficient f(kl) for reflecting the tendency in which the increasing rate of the NOx emission quantity becomes gentle in the region where the load ratio KL is large to the NOx concentration estimated value [NOx]

FIG. 3 is a drawing to explain an example of a correct coefficient f(kl) for reflecting the tendency in which the increasing rate of the NOx emission quantity becomes gentle in the region where the load ratio KL is large to the NOx concentration estimated value [NOx]. The correct coefficient f(KL) shown in FIG. 3 keeps the reference value 1.0 in the region in which the KL is equal to or less than forty, and proportionally decreases as the KL increases in the region in which the KL exceeds forty. This f(KL) can be represented by the following expression.

$$f(KL) = (200 - KL)/160$$

Provided that $f(KL)=1$ when $f(KL)>1$ \qquad (3)

Figure 4:
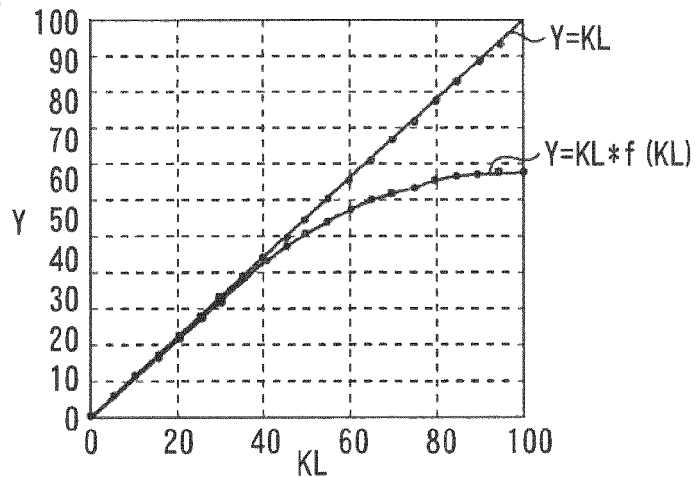
FIG. 4 is a drawing in which relationship of Y=KL and relationship of Y=KL*f(KL) are depicted in a range of $0 \leq KL \leq 100$.

FIG. 4 is a drawing in which relationship of Y=KL and relationship of Y=KL*f(KL) are depicted in a range of $0 \leq KL \leq 100$. As shown in FIG. 4, the curve of Y=KL*f(KL) is similar to the curve of the relationship between the actual measurement value of the NOx emission quantity and the load ratio KL shown in FIG. 2. As seen above, the above mentioned correct coefficient f(KL) can give the movement of a variable which proportionally increases with KL a resemblance to the movement of the actual NOx emission quantity (the movement shown in FIG. 2) by being multiplied to the variable. Thus, the internal energy actually generated under a load ratio KL can be accurately estimated by multiplying the f(KL) to the result (Qi) of the expression (1). Also, the actual NOx concentration under a load ratio KL can be accurately estimated by multiplying the f(KL) to the result ([NOx]) of the expression (2).

Following arithmetic expression is a modification of the above described expression (2) obtained by converting the integral term to a $\Sigma$ term so as to conform to the procedure executed by the ECU 50 (i.e., summation of discrete values) and converting the proportional coefficient $\alpha$ to the correct coefficient f(KL) expressed by the above described expression (3).

$$[NOx] = \frac{\left(\sum_{\theta_1}^{\theta_2} V_\theta \frac{dP_\theta}{d\theta} \Delta\theta\right) \times f(KL)}{KL} \quad (4)$$

The system according to the present embodiment calculates the NOx concentration estimated value according to the above described expression (4) while the internal combustion engine 10 is in an operation. Concretely, the ECU50 calculates the load ratio KL during every expansion stroke based on the intake air quantity Ga inhaled prior to the stroke. Further, the ECU50 detects a cylinder volume $V_\theta$ and a cylinder internal pressure $P_\theta$ every predetermined crank angle interval $\Delta\theta$ during an expansion stroke. A map in which cylinder volumes $V_\theta$ of the individual cylinders are defined using the relationship with crank angle $\theta$ is stored in the ECU50. In this stage, the cylinder volume $V_\theta$ is calculated according to the map, based on the output of the crank angle sensor 36.

The ECU50 proceeds the summation of $\Sigma\{V_\theta \cdot (dP_\theta/d\theta)\Delta\theta\}$ with every crank angle interval $\Delta\theta$ from the ignition crank angle $\theta_1$ to the burnout crank angle $\theta_2$. The NOx concentration estimated value [NOx] according to the expression (4) is calculated when the standardization based on the load ratio KL and the correction by the correct coefficient f(KL) are given to the summed value obtained as a result of the above.

In the estimation by the above described expression (4), cylinder internal pressure P is used as basic data of the NOx concentration. According to such an estimation technique, it is possible to reflect the change of combustion condition of the fuel/air mixture in the cylinder to the NOx concentration estimated value [NOx] when such a change arises due to change of ignition timing or arising of knocking. Because of this, the estimation technique discussed above can implement a function for always estimating the NOx concentration with high accuracy regardless of the fluctuation of operating condition of the internal combustion engine 10.

Figure 5:
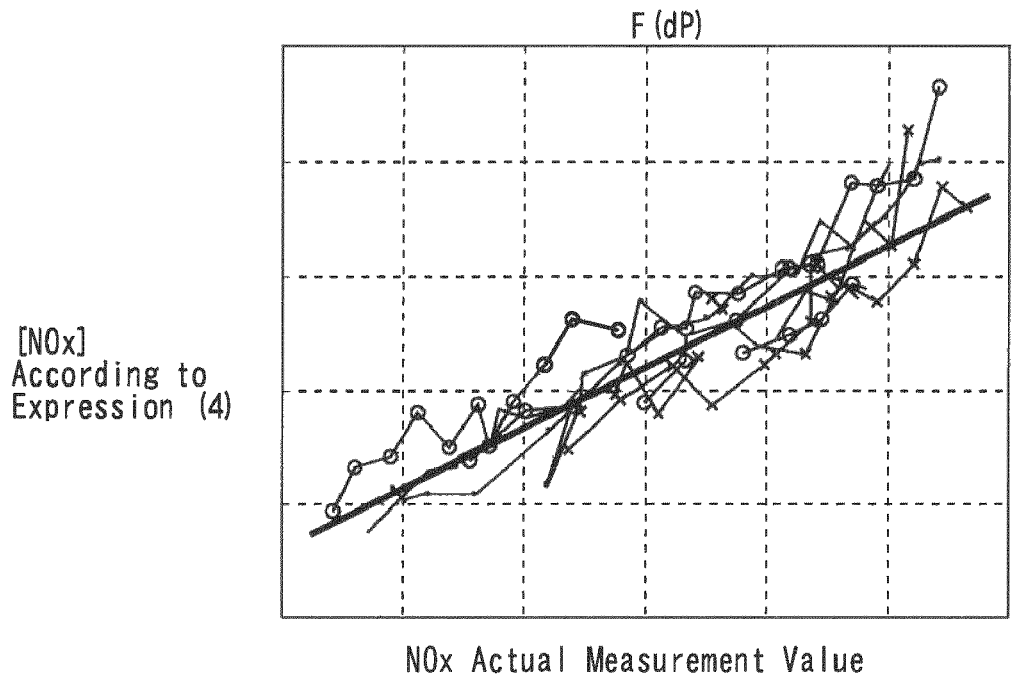
FIG. 5 is a drawing which shows a correlation between NOx concentration estimated values [NOx] calculated by the system according to the first embodiment of the present invention and actual measurement values of NOx concentration of exhaust gas.

FIG. 5 is a drawing which shows a correlation between NOx concentration estimated values [NOx] calculated by the system according to the present embodiment and actual measurement values of NOx concentration of exhaust gas of the internal combustion engine 10. Each point shown in FIG. 5 is plotted at a position determined by a combination of a NOx concentration estimated value [NOx] and an actual measurement value of NOx concentration which are obtained under a different condition that is different from conditions for other points. Here, "the different condition" means that both of engine revolution number NE and load ratio KL are different. Further, the air fuel ratio of the fuel/air mixture is controlled to the theoretic mixture ratio.

The result shown in FIG. 5 presents that NOx concentration estimated value [NOx] calculated by the expression (4) shows extremely high correlation for actual measurement value of the NOx concentration under every driving condition. Thus, according to the system of the present embodiment, it is possible to calculate a NOx concentration estimated value [NOx] that is accurately agree with an actual measurement value of the NOx concentration under every driving condition.

In the above described first embodiment, the "internal energy correlation value calculating means" in the first aspect of the present invention is realized when the ECU50 performs the summation procedure of $\Sigma\{V_\theta \cdot (dP_\theta/d\theta)\Delta\theta\}$ in the expression (4). Further, the "NOx concentration estimation means" in the first aspect of the present invention is realized when the ECU50 gives the standardization by the load ratio KL and the correction by the correct coefficient f(KL) to the result obtained by the above.

Also, in the above described first embodiment, the air flow meter 26 corresponds to the "intake air quantity detecting means" in the second and third aspect of the present invention. Further, the "NOx quantity calculating means" in the second aspect of the present invention is realized when the ECU50 performs the summation procedure of $\Sigma\{V_\theta \cdot (dP_\theta/d\theta)\Delta\theta\}$ in the expression (4). Moreover, the "standardizing means" in the second aspect of the present invention and the "correction means" in the third aspect of the present invention are realized when the ECU50 gives to the result obtained by the above the standardization by the load ratio KL and the correction by the correct coefficient f(KL), respectively.

Second Embodiment

Next, second embodiment of the present invention will be described. The system according to the present embodiment can be implemented by making the ECU 50 calculates the NOx concentration estimated value [NOx] according to the expression (5) to be described below in the configuration shown in FIG. 1.

In the above described first embodiment, it is assumed that the internal combustion engine is driven under a condition in which air fuel ratio is controlled to the theoretic mixture ratio. However, as for the internal combustion engine 10, fuel increase correction and fuel decrease correction may be required. When fuel is controlled according to those correction requirements, the air fuel ratio of the internal combustion engine 10 necessarily comes off from the theoretic mixture ratio.

The more the oxygen quantity in fuel/air mixture, i.e., the leaner the air fuel ratio, the easier the NOx is generated in exhaust gas. Because of this, it is necessary to reflect an effect of the air fuel ratio to the NOx concentration estimated value [NOx] in order to precisely estimate the NOx concentration in the region where air fuel ratio comes off from the theoretic mixture ratio.

The operational expression (5) shown below is the one provided for satisfying the above described requirement. To be concrete, the expression (5) is provided by multiplying an air fuel ratio correct coefficient $\lambda$ to the right-hand side of the above described expression (4). Here, it should be noted that the air fuel ratio correct coefficient $\lambda$ is a ratio of the actual measurement value of the exhaust air fuel ratio A/F to the theoretic mixture ratio (it is assumed "14.5" here ($\lambda=(A/F)/14.5$).

$$[NOx] = \frac{\left(\sum_{\theta_1}^{\theta_2} V_\theta \frac{dP_\theta}{d\theta} \Delta\theta\right) \times f(KL)}{KL} \times \lambda \quad (5)$$

The ECU 50 can actually measure the exhaust air fuel ratio A/F based on an output of the air fuel ratio sensor 40. Further, the above described air fuel ratio correct coefficient λ coincides with the reference value 1.0 when the air fuel ratio A/F agrees to the theoretic mixture ratio, while increasing its value as the A/F becomes leaner and decreasing its value as the A/F becomes richer. Because of this, it is possible to adequately reflect the effect arising in the NOx generated quantity based on air fuel ratio to the NOx concentration estimated value [NOx], according to the above described expression (5). Thus, the system of the present embodiment can calculate the NOx concentration estimated value [NOx] with extreme accuracy even in a condition in which the air fuel ratio comes off from the theoretic mixture ratio.

In the above described second embodiment, the air-fuel ratio sensor 40 corresponds to the "air fuel ratio detecting means" in the fourth aspect of the present invention. Further, the "correction means" is realized when the ECU 50 performs the multiplying procedure of λ in the expression (5).

Third Embodiment

Next, third embodiment of the present invention will be described with reference to FIGS. 6 through 8. The system according to the present embodiment can be implemented by adding a pressure sensor which detects intake pipe pressure Pm to the configuration shown in FIG. 1 and making the ECU 50 calculates the NOx concentration estimated value [NOx] according to the expression (6) described later.

The higher the temperature of the in-cylinder gas, the easier the quantity of NOx generated in the cylinder becomes large. In the cylinder, there is residual gas (including the EGR gas) remaining in the cylinder as well as new air that is inhaled during an intake stroke. Part of the energy generated in the cylinder is used for elevating the temperature of the residual gas. Because of this, the more the quantity of the residue gas, the harder the temperature of the in-cylinder gas elevates and the smaller the NOx generated quantity.

In the above described first and second embodiments, the NOx concentration estimated value [NOx] is calculated while assuming that the ratio of burned gas remaining in the cylinder is not largely fluctuated. However, when the valve overlap varies due to the functions of VVTs 20 and 24 in the internal combustion engine 10, there arises a meaningful change in the ratio of the residual gas in the cylinder. Because of this, the estimation accuracy as for the NOx concentration may be deteriorated when the valve overlap is changed by the VVTs 20 and 24, according to the technique employed in the above described first and second embodiments.

Figure 6:
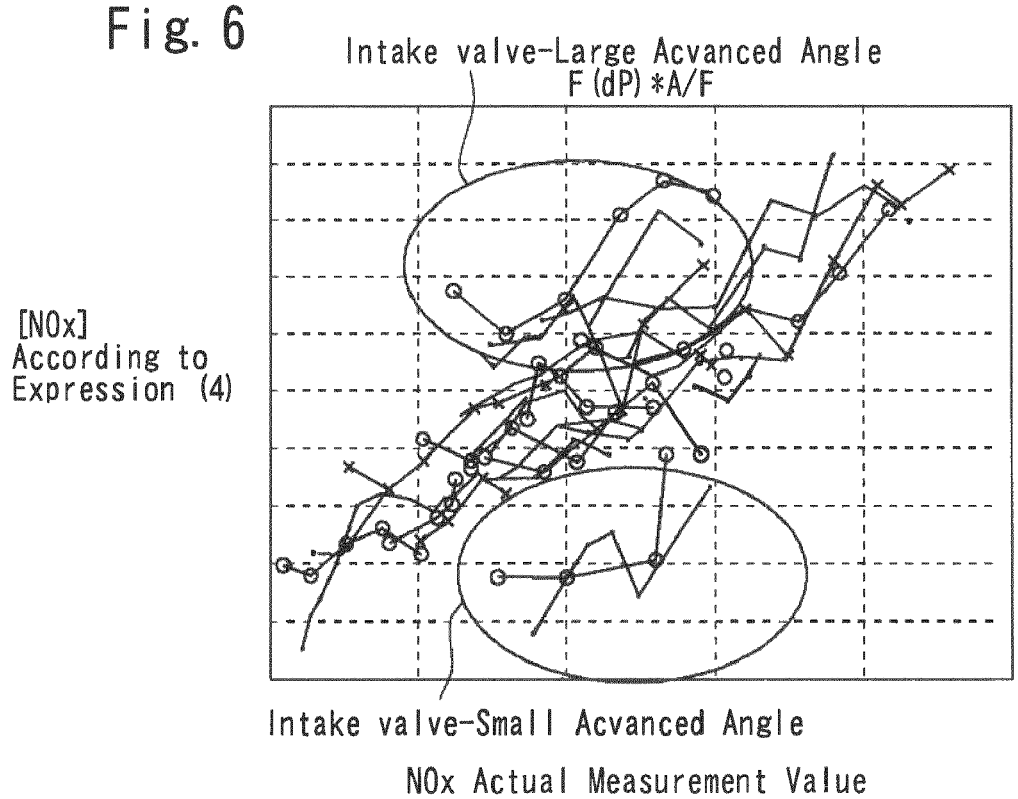
FIG. 6 shows a result indicating an effect given to the NOx concentration estimated value [NOx] according to the expression (4) due to the change of the residual gas quantity arising with the actuation of a VVT.

FIG. 6 shows a result indicating an effect given to the NOx concentration estimated value [NOx] by the expression (4) due to the change of the residual gas quantity arising with the actuation of the VVT. Each point shown in FIG. 6 is plotted at a position determined by a combination of a NOx concentration estimated value [NOx] and an actual measurement value of NOx concentration which are obtained under a different condition that is different from conditions for other points. The points shown in FIG. 6 as "intake valve-advanced angle small" indicate results that are obtained by actuating the VVT 20 so that the advanced angle quantity of the intake valve 18 decreases, that is, so that the valve overlap decreases. On the other hand, the points shown in FIG. 6 as "intake valve-advanced angle large" indicate results that are obtained by actuating the VVT 20 so that the advanced angle quantity of the intake valve 18 increases, that is, so that the valve overlap increases.

The results shown in FIG. 6 shows that the [NOx] value according to the expression (4) becomes too small in a condition in which the advanced angle is small so that the residual gas (the internal EGR gas) quantity becomes little, although large quantity of NOx is actually generated due to the effect of the condition. Also, the result indicates that the expression (4) calculates too much [NOx] value in a condition in which the advanced angle is large so that the residual gas quantity becomes large, although the actual quantity of NOx becomes little due to the effect of the condition.

The system according to the present embodiment has a feature in a point suppressing enough the estimated error due to the above described reason by reflecting the residual gas quantity in the cylinder to the NOx concentration estimated value [NOx]. The method for reflecting the residual gas quantity to the [NOx] will be described hereinafter.

Figure 7:
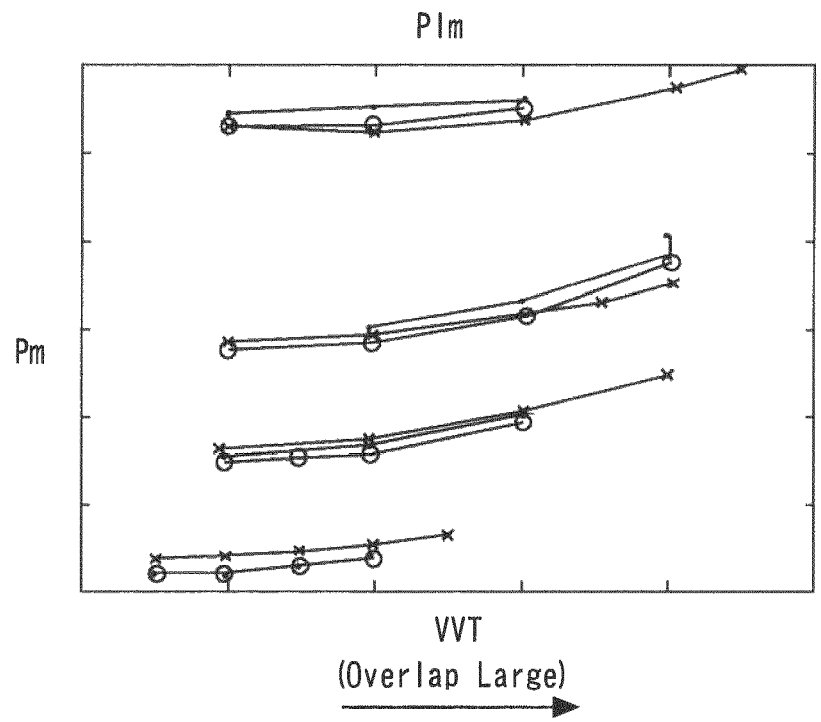
FIG. 7 is a drawing to explain the relationship between an advanced quantity of an intake valve and an intake air pipe pressure Pm.

FIG. 7 is a drawing to explain the relationship between an advanced quantity of an intake valve and an intake air pipe pressure Pm. Each of the plurality of solid lines shown in FIG. 7 is obtained by linking a plurality of results (points) that are detected under a condition in which advanced angle of the intake valve 18 (i.e., valve overlap) is changed while engine revolution number NE and load ratio KL are kept constant, respectively. These solid lines show, respectively, that the valve overlap and the intake pipe pressure Pm correlate to each other. More concretely, the plurality of solid lines shown in FIG. 7 indicates that the intake pipe pressure Pm rises as the valve overlap becomes large so as to increase the residual gas quantity. Accordingly, the intake pipe pressure Pm can be used as a substitute characteristic value of the residual gas quantity.

The operating expression (6) shown below is an expression for reflecting the residual gas quantity to the NOx concentration estimated value [NOx] using the intake pipe pressure Pm. It should be noted that τ in the expression (6) is a fuel injection time period given to the fuel injector 30 as instruction.

$$[NOx] = \alpha \times \frac{\left(\sum_{\theta_1}^{\theta_2} V_\theta \frac{dP_\theta}{d\theta} \Delta\theta\right) \times f(Pm)}{\tau} \quad (6)$$

The above expression (6) is actually a rewrite of the expression (5) obtained by replacing the correct coefficient f(KL) to f(Pm) that uses Pm as a parameter. That is, the (1/KL)*λ in the expression (5) can be expanded as shown below.

$$(1/KL)*\lambda = (1/KL)*(A/F)/14.5 \quad (7)$$

(1/KL)*A can be replaced by a coefficient, because KL is a correlation value of the intake air quantity Ga, and A means Ga. Representing this coefficient and 14.5 by one coefficient β, the relationship of the expression (7) can be described as follows.

$$(1/KL)*\lambda = \beta/F \quad (8)$$

F can be replaced by τ because it means injection quantity. Thus, (1/KL)*λ in the expression (5) is equivalent to β*(1/τ) in the expression (6). Thus, the expression (6) is substantially the same as the expression (5), except that the parameter of the correct coefficient f is rearranged from the load ratio KL to the intake pipe pressure Pm.

Similar to the f(KL) shown in FIG. 3, the correct coefficient f(Pm) maintains the reference value 1.0 in the region in which the intake pipe pressure Pm is low, and decreases toward the minimum value 0 as the intake pipe pressure Pm increases in the region in which the Pm is high. As discussed above, the larger the residual gas quantity is, the higher the intake pipe pressure Pm becomes (see FIG. 7). Thus, according to the correct coefficient f(Pm), the NOx concentration estimated value [NOx] can be corrected to be small when the residual gas quantity is large so that the actual NOx quantity is little.

Figure 8:
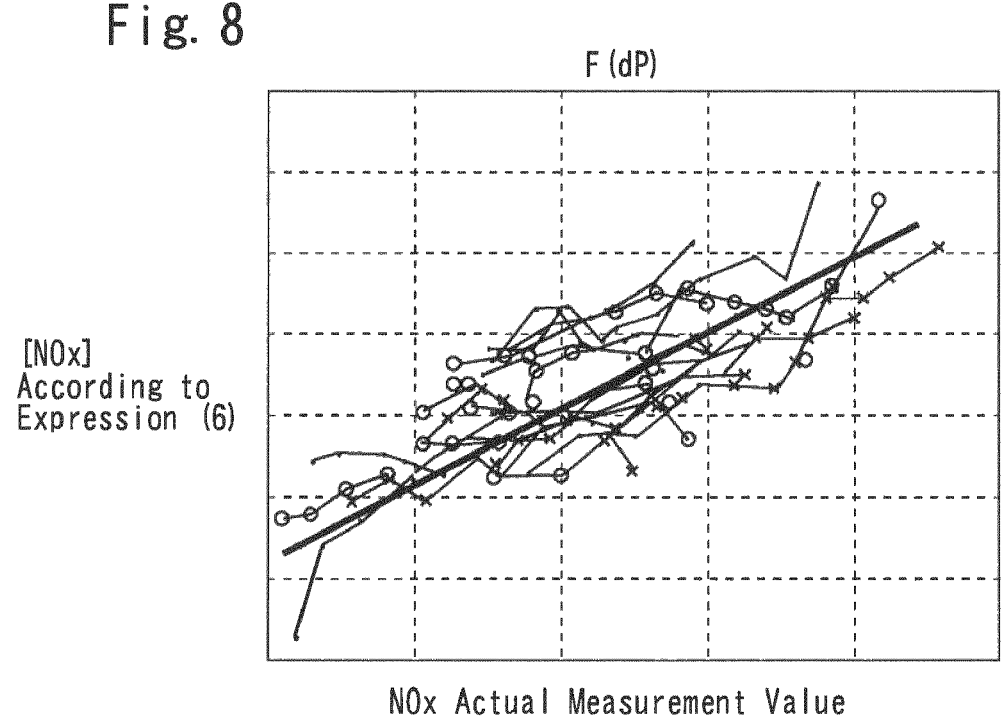
FIG. 8 is a drawing which shows a correlation between NOx concentration estimated values [NOx] calculated according to the expression (6) and the actual measurement values of NOx.

FIG. 8 is a drawing showing a correlation between NOx concentration estimated values [NOx] calculated according to the expression (6) and the actual measurement values of NOx. Each point shown in FIG. 6 is plotted at a position determined by a combination of a NOx concentration estimated value [NOx] and an actual measurement value of NOx concentration which are obtained under a condition in which the status of the VVT 20 of the intake valve is changed from that for the other points in addition to the engine revolution number NE and the load ratio KL. As shown in FIG. 8, the expression (6) makes it possible to calculate the NOx concentration estimated value [NOx] so that it always shows high correlation to the actual measurement value of the NOx without being affected by the change of state of the VVT 20. Because of this, the system according to the present embodiment can estimate the NOx concentration of the exhaust gas precisely regardless whether the residual gas quantity is large or small.

Although the above described third embodiment reflects the effect due to the residual gas to the NOx concentration estimated value [NOx] by using the intake pipe pressure Pm, the technique is not limited to this. That is, the residual gas quantity in the cylinder can be calculated by a known technique (e.g., in-cylinder DJ technique) using, for example, intake stroke pressure and exhaust stroke pressure as basic data. In a case where the residual gas quantity can be calculated, other parameter which shows the characteristics similar to that of the intake pipe pressure Pm, i.e., the characteristics that makes the parameter value large as the residual gas quantity increases and makes the parameter value large as the load ratio KL becomes large. The effect due to the residual gas quantity may be reflected to the [NOx] by performing the calculation of the expression (6) while replacing the Pm to the other parameter.

Further, although the above described third embodiment reflects the effect due to the residual gas as well as effect due to the load ratio KL to the NOx concentration estimated value [NOx] by using the correction coefficient f(Pm), the technique is not limited to this. That is, for the purpose of improving the accuracy of the NOx concentration estimated value [NOx], all things to do is correcting the [NOx] to be small. In a case where the residual gas quantity can be obtained, therefore, the above described function may be implemented, for example, by reflecting the residual gas quantity to the denominator of the right-hand side of the expression (5).

Further, although the reason due to which the residual gas quantity changes is limited to the change of the valve overlap in the above described third embodiment, the reason is not limited to this. For example, as for an internal combustion engine having an EGR mechanism for circulating exhaust gas to the intake system, residual gas quantity may be change depending on the condition of the EGR mechanism. According to the technique used in the present embodiment, it is always possible to accurately reflect the effect of the residual gas quantity change to the NOx concentration estimated value [NOx] without concerning the reason of the change.

It should be noted that, in the above described third embodiment, the intake pressure sensor corresponds to the "residual gas quantity correlation value sensing means" in the fifth aspect of the present invention. Further, the "correction means" in the fifth aspect of the present invention is realized when the ECU 50 performs the multiplying procedure as for the correct coefficient f(Pm) in the expression (6).

Moreover, in the above described third embodiment, the air flow meter 26 corresponds to the intake air quantity detecting means in the sixth aspect of the present invention. Also, the "residual gas quantity correlation value sensing means" in the fifth aspect of the present invention can be realized by making the ECU 50 calculate a residual gas quantity. Even more particularly, the "correction means" in the sixth aspect of the present invention can be realized by making the ECU 50 set a parameter which becomes large as the residual gas quantity increases and becomes large as the load ratio increases, then making the ECU 50 perform the calculation of the expression (6) in which Pm is replaced by the parameter.

Fourth Embodiment

[Feature of Fourth Embodiment]

Figure 9:
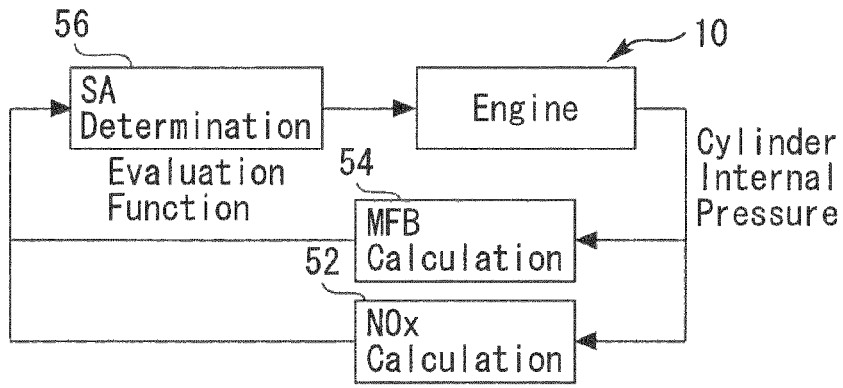
FIG. 9 is a block diagram to explain the details of the control that is carried out by an ECU in a fourth embodiment of the present invention.

Next, fourth embodiment of the present invention will be described with reference to FIGS. 9 and 10. FIG. 9 is a block diagram to explain the details of the control that is carried out by the ECU 50 in the present embodiment. fAs shown in FIG. 9, a NOx calculation portion 52, an MFB calculation portion 54 and an SA determination portion 56 are provided in the ECU 50 in this embodiment. All of these portions are realized by the ECU 50 performing a control program stored therein.

The NOx calculation portion 52 is a portion that calculates NOx concentration estimated value [NOx] by any one of techniques according to the first to three embodiments. MFB calculation portion 54 is a portion that calculates an MFB which is the characteristic value of combustion condition in the cylinder by a technique described below. The MFB is represented by a ratio ($Q1/Q_{@ATDC60}$) of a heating value $Q1$ that is produced after execution of ignition until the crank angle reaches to a particular crank angle to a heating value $Q_{@ATDC60}$ produced until the crank angle reaches to the burn-out crank angle (it is assumed ATDC60° CA in the present embodiment).

The torque produced by the internal combustion engine 10 varies even if the load ratio KL and the air fuel ratio A/F are constant, if the ignition timing is changed. Because of this, it is desirable that the ignition timing of the internal combustion engine 10 is controlled to a crank angle by which the torque is generated most effectively, from a viewpoint of improving the output characteristics. In other words, from the viewpoint of improving the output power, it is desirable to control the ignition advance value SA to the value (MBT) that realizes the above described crank angle.

In this embodiment, the MFB calculation portion 54 calculates the MFB while setting the above described particular crank angle to, especially, 8 degree CA After Top Dead Center (ATDC). Hereinafter, the MFB in the present embodiment is described as "$MFB_{@ATDC8}$" so that this point becomes clear. The operating expression (9) shown below is the operating expression of $MFB_{@ATDC8}$ that is calculated by the MFB calculation portion 54.

$$MFB_{@ATDC8} = Q_{@ATDC8}/Q_{@ATDC60} \quad (9)$$

The above described expression (9) (especially the setting of ATDC8 degree CA to the first crank angle) is determined so that it matches with a characteristic of the internal combustion engine 10. In the present embodiment, the $MFB_{@ATDC8}$ calculated by this expression (9) has correlation with the accordance degree between the MBT and the ignition advance value SA of the internal combustion engine 10. More concretely, the above described $MFB_{@ATDC8}$ becomes closer to 0.5 as the ignition advance value SA of the internal combustion engine 10 closes to the MBT, and becomes 0.5 under a situation in which both of them accord with each other. Because of this, the $MFB_{@ATDC8}$ can be used as a characteristic value indicating the corresponding degree between the ignition advance value SA and the MBT, in the present embodiment.

SA determination portion 56 is a portion for determining the ignition advance value SA that should be used in the internal combustion engine 10 based on the NOx concentration estimated value [NOx] and the $MFB_{@ATDC8}$. More concretely, the SA determination portion 56 firstly calculates an evaluation function J according to the following expression (10). Here, "A" in the following expression is a weighting coefficient that is appropriately determined corresponding to the operating condition of the internal combustion engine 10. Also, "a" in the following expression is the target NOx concentration of the internal combustion engine 10, that is, the target value of the [NOx].

$$J = A \times (MFB_{@ATDC8} - 0.5)^2 + (1-A) \times ([NOx] - a)^2 \quad (10)$$

The evaluation value J calculated by the expression (10) becomes smaller as the $MFB_{@ATDC8}$ approaches to 0.5, i.e., as the ignition advance value SA approaches to the MBT. However, in the region where the ignition advance value SA is near to MBT, the NOx tends to increase as the both of them approach. Because of this, the evaluation value J shows a tendency of firstly decreasing then turning to increase when the ignition advance value SA is gradually brought closer to the MBT.

As for the internal combustion engine 10, NOx emission quantity is expected to be small at the same time that high power efficiency is expected. The evaluation value J discussed above becomes the minimum value when the each of the $MFB_{@ATDC8}$ and the [NOx] approaches to the respective target value (the optimum value) with a good balance. Thus, it is preferable that the ignition advance value SA is set to a value by which the evaluation value J agrees with the minimum value for achieving a good balance between the requirement about the power efficiency and the requirement about the NOx emission quantity in high level.

In this embodiment, the SA determination portion 56 secondly searches the ignition advance value SA by which the evaluation value J calculated according to the expression (10) is minimized. To be concrete, calculation of the evaluation value J is executed while changing the ignition advance value SA to search the optimized SA by which the value J is minimized. Further, the SA determination portion 56 holds the SA that is searched for in this way as a command value to the internal combustion engine 10. By the above-mentioned treatment, the system of the present embodiment can give a superior exhaust emission characteristic and superior output characteristics to the internal combustion engine 10 together.

[Concrete Treatment in Forth Embodiment]

Figure 10:
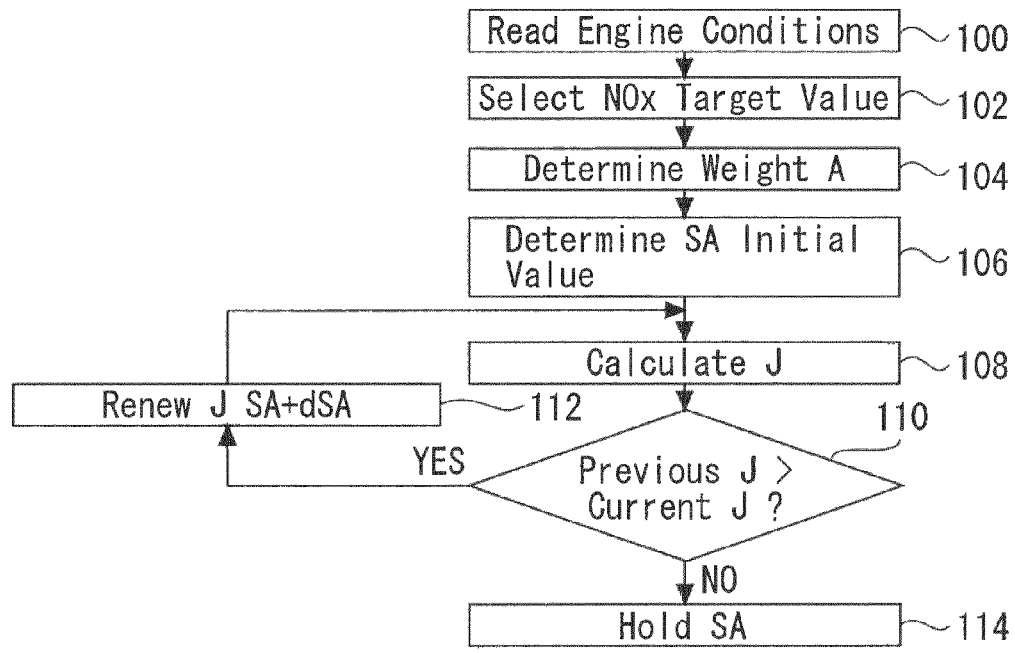
FIG. 10 is a flowchart of a routine that is carried out by the ECU in the fourth embodiment of the present invention.

FIG. 10 is a flowchart of the routine executed by the ECU50 in the present embodiment. In the routine shown in FIG. 10, firstly, driving condition of the internal combustion engine 10 is read (step 100). In this step, more concretely, the [NOx] calculated by any one of the techniques of the first to third embodiments as well as the MFB calculated by a well-known technique are read, in addition to the engine revolution number NE and the load ratio KL (intake air quantity Ga).

Next, target value "a" of the NOx concentration is selected (step 102). The target NOx concentration of the internal combustion engine 10 is not always constant. In other words, it is preferable that the target value "a" of the NOx concentration is changed appropriately responding to an operating condition of the internal combustion engine 10, for satisfying various requirements required to the internal combustion engine 10. In the present embodiment, a map in which the target value "a" is defined by the relationship to the operating condition of the internal combustion engine 10 is stored in the ECU50. In this step, the target value "a" is selected according to the map.

Next, the weighting coefficient "A" is determined (step 104). As for the internal combustion engine 10, the importance of obtaining superior power efficiency and the importance of getting superior emission characteristic is not always constant. For example, it is desirable to give priority to the requirement of the power efficiency over the requirement of the emission characteristic under the situation in which acceleration is required. Also, it is desirable to make the reverse priority setting in a steady operation. From the above described viewpoint, a map in which the weighting coefficient "A" is defined by the relationship to the operating state of the internal combustion engine 10 is stored in the ECU50. This map is designed so that the weighting coefficient "A" approaches to the maximum value 1.0 as the priority of the power efficiency becomes higher, and the weighting coefficient "A" approaches to the minimum value zero as the priority of the emission characteristic becomes higher. In the present step 104, the weighting coefficient "A" is determined according to this map.

Next, the initial value SAO of the ignition advance value SA is set (step 106). The initial value SAO is set to a sufficiently small value. More concretely, it is set to a value that is obvious to be located at an opposite side of the MBT across the SA that minimizes the evaluation value J according to the expression (10).

Next, the evaluation value J is calculated according to the expression (10) (step 108). Subsequently, it is determined whether the J calculated in this processing cycles is smaller than the J that is calculated in the last cycle (step 110).

A sufficiently large value is set to the evaluation value J by an initializing treatment. Because of this, the condition of step 110 will be satisfied in the cycle in which the evaluation value J is calculated for the first time. Likewise, the condition is judged to be satisfied while the ignition advance value SA is in the vicinities of the initial value SAO. In this case, the ignition advance value SA is renewed so as to increase by a predetermined value dSA (step 112). Afterwards, the treatment of step 108 is executed again.

As the above described treatment is repeated, the change of the evaluation value J turns from decreasing to increasing before long. When this inversion occurs, the condition of step 110 becomes failure. In this case, the ignition advance value SA that is set at the time point is held (step 114).

According to the above-mentioned treatment, it becomes possible to freely set the weighting coefficient "A" and the NOx target value, respectively. Further, according to this treatment, it becomes possible to hold the ignition advance value SA which minimizes the evaluation value J under those settings. Because of this, the system of the present embodiment can achieve the best balance corresponding to a driving condition of the internal combustion engine 10 between the output characteristics and the emission characteristic of the internal combustion engine 10.

In the above described fourth embodiment, $MFB_{@ATDC8}$ is used as the characteristic value which shows the degree of correspondence between the ignition advance value and the MBT while considering the characteristics of the internal combustion engine 10. Thus, as for an internal combustion engine which has other characteristics, the MFB may be calculated while using a crank angle which is different from the ATDC8° CA as the particular crank angle. It should be noted that this point is similarly applicable to the other embodiments described below.

It should be noted that, in the fourth embodiment, the $MFB_{@ATDC8}$ corresponds to the "power efficiency index mark" in the eighth aspect of the present invention, and the "power efficiency index mark calculating means" in the eighth aspect of the present invention is implemented when the ECU50 calculates the $MFB_{@ATDC8}$ Further, in the present embodiment, the $(MFB_{@ATDC8}-0.5)$ in the expression (10) corresponds to the "index mark deviation" in the eighth aspect of the present invention, and the "index mark deviation calculating means" in the eighth aspect of the present invention is realized when the ECU50 performs the calculation. Further, the ([NOx]−a) in the expression (10) corresponds to the "concentration deviation" in the eighth aspect of the present invention, and the "concentration deviation calculating means" in the eighth aspect of the present invention is realized when the ECU50 performs the calculation. Moreover, the "evaluation value calculating means" in the eighth aspect of the present invention is implemented when the treatments of steps 110 to 114 is executed and the "ignition timing control means" in the eighth aspect of the present invention is realized when the step 108 is executed by the ECU 50, respectively.

Also, in the above described fourth embodiment, the "weighting coefficient changing means" in the ninth aspect of the present invention is realized when the ECU50 performs the treatment of step 104.

Fifth Embodiment

Figure 11:
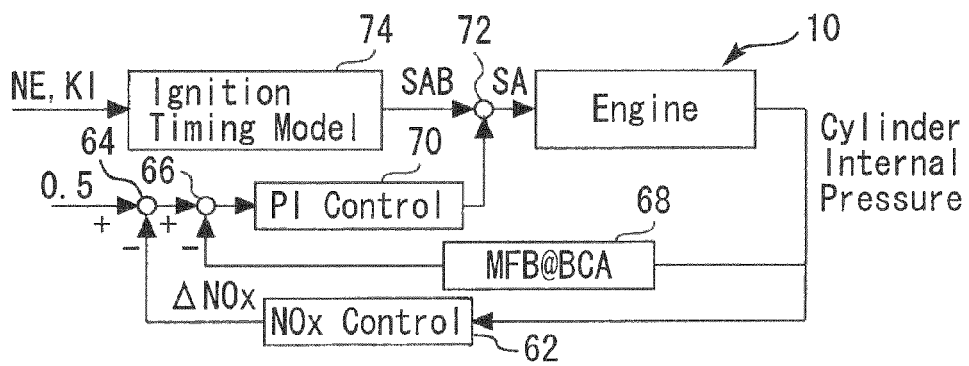
FIG. 11 is a block diagram to explain the details of the control that is carried out by the ECU in a fifth embodiment of the present invention.

Next, fifth embodiment of the present invention will be described with reference to FIG. 11. FIG. 11 is a block diagram to explain the details of the control that is carried out by the ECU 50 in the present embodiment. All of the constituent elements shown in FIG. 11 are realized by ECU50 performing a control program stored therein.

As shown in FIG. 11, a NOx suppression portion 62 is provided in the ECU50 in the present embodiment. The NOx suppression portion 62 is a block for calculating a NOx correction value $KNOx=\gamma \cdot \Delta NOx$. More concretely, the NOx suppression portion 62 performs the following treatment.

i) Calculating the NOx concentration estimated value [NOx] by any one of techniques of the above described first to third embodiments;

ii) Calculating the difference $\Delta NOx$ (=[NOx]−a) between the calculated [NOx] and the NOx concentration target value "a";

iii) Calculating the NOx correction value $KNOx=\gamma \cdot \Delta NOx$ by multiplying the above described difference $\Delta NOx$ by a constant $\gamma$.

The NOx correction value is a coefficient that becomes larger as the NOx concentration estimated value [NOx] becomes excessively larger than the target value "a". As shown in FIG. 11, the NOx correction value KNOx is supplied to a first subtraction portion 64 in the ECU50. The first subtraction portion 64 is supplied with 0.5 which is the optimal value of the $MFB_{@ATDC8}$. The first subtraction portion 64 supplies to a second subtraction portion 66 of the subsequent stage the value obtained by subtracting the NOx correction value KNOx from 0.5 (hereinafter called a "first command value $OUT_{64}$").

The second subtraction portion 66 is supplied with $MFB_{@ATDC8}$ from an MFB calculation portion 68. The MFB calculation portion 68 is a block which calculates the $MFB_{@ATDC8}$ by a known technique according to the above described expression (9) explained in the fourth embodiment. The second subtraction portion 66 supplies to a PI controlling portion 70 a value obtained by subtracting the $MFB_{@ATDC8}$ from the first command value $OUT_{64}$ supplied from the first subtraction portion 64 (hereinafter called a "second command value $OUT_{66}$"). The second command value $OUT_{66}$ supplied to the PI controlling portion 70 can be presented by the next expression.

$$OUT_{66}=OUT_{64}-MFB_{@ATDC8}=0.5-KNOx-MFB_{@ATDC8} \quad (11)$$

The second command value $OUT_{66}$ calculated by the expression (11) becomes a positive value when the $MFB_{@ATDC8}$ is smaller than the first command value $OUT_{64}$. In other words, the second command value $OUT_{66}$ becomes a positive value when the $MFB_{@ATDC8}$ is too small compared to the combustion rate represented by the first command value $OUT_{64}$, while becoming a negative value when the $MFB_{@ATDC8}$ is too large.

The PI controlling portion 70 is a block that calculates the proportional term P and the integral term I of the second command value $OUT_{66}$ so as to calculate the sum of them as an advance correction value $\Delta SA$. The advance correction value $\Delta SA$ calculated by the PI controlling portion 70 is supplied to an adding portion 72. The adding portion 72 is also supplied with a basic advance value SAB from an ignition timing model calculation portion 74. The ignition timing model calculation portion 74 is a block that calculates an ignition advance value which is in conformity with a driving condition of the internal combustion engine 10 as the basic advance value SAB based on the engine revolution number NE and the engine load KL. The adding portion 72 supplies to the internal combustion engine 10 the value obtained by adding the basic advance value SAB with the advance correction value $\Delta SA$ as the conclusive ignition advance value SA. The internal combustion engine 10 determines the ignition timing of each cylinder based on the ignition advance value SA calculated by this war.

The ignition advance value SA agrees with the basic advance value SAB when the advance correction value $\Delta SA$ is zero. Further, the ignition advance value SA becomes an advanced side value than the SAB when the $\Delta SA$ is positive, while becoming a retarded side value compared to the SAB when the $\Delta SA$ is negative. The ignition correction value $\Delta SA$ is updated toward a positive direction when the second command value $OUT_{66}$ is positive, while being updated toward a negative direction when the second command value $OUT_{66}$ is negative.

As stated above, the second command value $OUT_{66}$ becomes positive when the $MFB_{@ATDC8}$ is smaller than the first command value $OUT_{64}$. In this case, the advance correction value $\Delta SA$ is updated toward the positive direction so that the ignition advance value SA is corrected toward the advance side. As a result, the combustion velocity increases whereby the $MFB_{@ATDC8}$ comes close to the first command value OUT64. Conversely, when the $MFB_{@ATDC8}$ is larger than the first command value $OUT_{64}$, the second command value $OUT_{66}$ becomes negative thereby the ignition advance value SA is corrected toward the retard side. As stated above, the system shown in FIG. 11 can control the ignition advance value SA of the internal combustion engine 10 so that the MFB$_{@ATDC8}$ comes close to the first command value OUT$_{64}$.

The first command value OUT64 becomes smaller than 0.5 as the NOx correction value KNOx becomes large, i.e., as the NOx concentration estimated value [NOx] becomes larger than the target value "a". Thus, the first command value OUT$_{64}$ becomes 0.5 when the [NOx] agrees with the target value "a". In this case, the ignition advance value SA is controlled so that the MFB$_{@ATDC8}$ becomes 0.5.

Practically, the NOx concentration estimated value [NOx] usually excesses the target value "a" in the process that the ignition advance value SA approaches to the MBT. In this case, the first command value OUT$_{64}$ is corrected to a value smaller than 0.5, firstly. Following this correction, the ignition advance value SA is corrected toward a retard side for the purpose of MFB$_{@ATDC8}$ becoming the value smaller than 0.5. As a result, the combustion speed in the cylinder becomes slow, whereby the NOx concentration falls. According to the above processing being continuously and repeatedly executed, the ignition advance value SA is controlled to an appropriate value that is close to the MBT and makes the [NOx] get closer to the target value.

As explained above, the system of the present embodiment can control the ignition advance value SA of internal combustion engine 10 to a value that realizes both of the superior power efficiency and the superior emission characteristic, while utilizing the NOx concentration estimated value [NOx], likewise a case of the fourth embodiment. Because of this, the system of the present embodiment can improve both of the power efficiency and the emission characteristic in good balance within all operating ranges of the internal combustion engine 10 without requiring complicated adaptation works.

It should be noted that, in the above described fifth embodiment, the MFB$_{@ATDC8}$ corresponds to the "power efficiency index mark" in the twelfth aspect of the present invention, and the MFB calculation portion 68 corresponds to the "power efficiency index mark calculating means" in the twelfth aspect of the present invention. Further, in this embodiment, the difference between the [NOx] and the target value "a" corresponds to the "concentration deviation" in the twelfth aspect of the present invention, and the NOx suppression portion 62 corresponds to the "concentration deviation calculating means" in the twelfth aspect of the present invention. Moreover, in the present embodiment, the first subtraction portion 64 corresponds to the "index mark target value setting means" in the twelfth aspect of the present invention, and the PI controlling portion 70 and the adding portion 72 correspond to the "ignition timing control means" in the twelfth aspect of the present invention, respectively.

Sixth Embodiment

Next, sixth embodiment of the present invention will be described with reference to FIG. 12. The system of the present embodiment can be realized when the target value of the NOx concentration estimated value [NOx] is set by a technique to be described below in the system of fourth or fifth embodiment.

Figure 12:
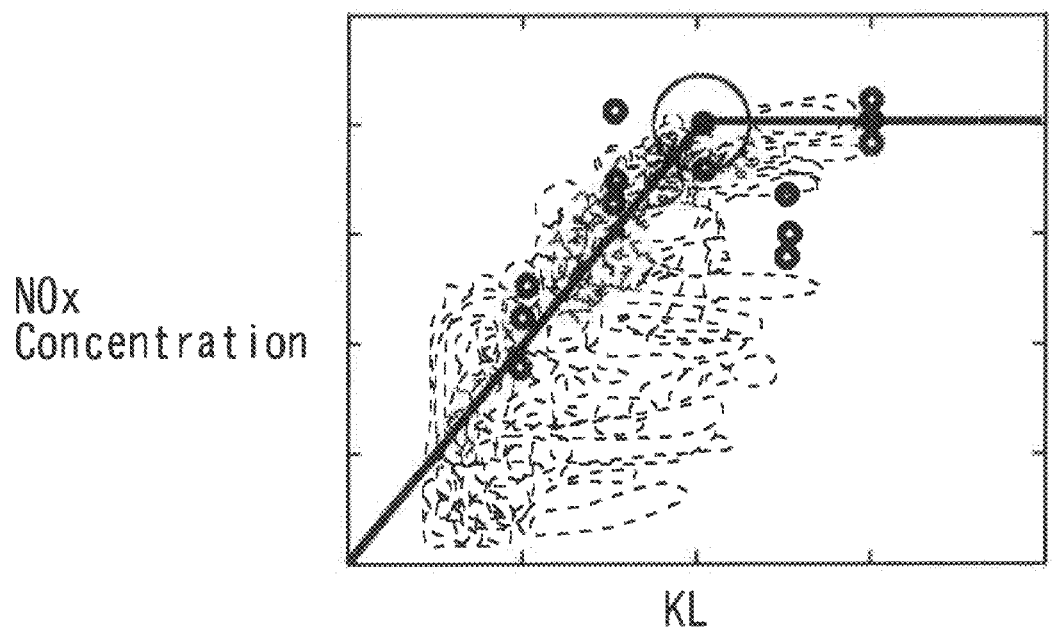
FIG. 12 is a drawing to explain a relationship between NOx concentration in exhaust gas of an internal combustion engine and load ratio KL.

FIG. 12 is a drawing to explain a relationship between the NOx concentration in exhaust gas of an internal combustion engine and the load ratio KL. The data shown by broken lines in FIG. 12 represent results that are obtained by driving a mass-produced type internal combustion engine that is ensured to satisfy the current regulation of exhaust gas in the specific operating mode (ten mode, 15 mode, LA4 mode).

Further, the data shown by ○ in FIG. 12 represent results that are obtained by stably driving the mass-produced type internal combustion engine discussed above in a constant engine revolution number (NE=1500 rpm, 2000 rpm, 3000 rpm).

The results shown in FIG. 12 show that the NOx concentration of the exhaust gas exhausted from the mass-produced type internal combustion engine becomes approximately proportional to the load ratio KL in the region in which the load ratio KL is small, while converging to an upper limit value in the region in which the load ratio KL exceeds a constant value (40% in the present embodiment). The polygonal line shown by a solid line in FIG. 12 represents the target value "a" that is set so as to accords with the tendency. In the present embodiment, function corresponding to the above described polygonal line (concretely, a proportional constant in the KL small region and the KL value at the folding point) is stored in the ECU50, and the target value "a" is set according to the function.

As stated above, according to the system of the fourth or fifth embodiment, the ignition advance value SA is controlled so that good combustion efficiency is implemented in the internal combustion engine 10 and the NOx concentration estimated value [NOx] gets closer to the target value "a". Because of this, when the target value "a" is set to a value that belongs to the solid line in FIG. 12, actual NOx concentration is suppressed to a value near the target value "a" while the combustion efficiency is optimized. In this case, the exhaust emission characteristic of the internal combustion engine 10 falls into the same level as that of the current mass-produced type internal combustion engine.

For the reasons stated above, the system of the present embodiment can give an emission characteristic fitting the requirement in the commercial scene and a superior power characteristic to the internal combustion engine 10 without requiring an execution of a complicated adaptation work. Because of this, the system of the present embodiment can reduce the number of man-hour for developing the internal combustion engine 10. Further, according to the above described treatment, the information required to set the target value "a" (the function of the polygonal line) is extremely small. Thus, the system of the present embodiment can be implemented without requiring great memory capacity.

In the sixth embodiment, it should be noted that the "control means" in the seventh aspect of the present invention is realized by the ECU50 controlling the ignition advance value SA by the technique of the fourth or fifth embodiment. Further, in the present embodiment, the "NOx concentration target value setting means" in the seventh aspect of the present invention is realized by the ECU50 setting the target value "a" according to the relationship shown by the solid line in FIG. 12.

Seventh Embodiment

Next, seventh embodiment of the present invention will be described with reference to FIG. 13. The system according to the present embodiment can be implemented by making the ECU 50 execute a deterioration judgment treatment of the catalyst 42 and the routine shown in FIG. 13 described later in the system of the fourth embodiment.

The catalyst 42 is deteriorated due to change with the passage of time. For preventing the NOx from being emitted into the atmosphere, it is necessary to reduce the NOx quantity exhausted from the internal combustion engine 10 as the deterioration of the catalyst 42 progresses. As stated above, the system of the fourth embodiment can change the degrees of importance of the power characteristic and the emission characteristic depending on the weighting coefficient "A" (see the above described expression (10)).

More concretely, this system can reduce the NOx quantity exhausted from the internal combustion engine 10 while increasing the degree of importance of the emission characteristic by minifying the weighting coefficient "A". Thus, the present embodiment is designed so that a condition is implemented in which the weighting coefficient "A" is set to a large value so as to put much importance in the power characteristic when the catalyst has a sufficient purification ability whereas the weighting coefficient "A" is set to a small value so as to put much importance in the emission characteristic when the deterioration of the catalyst 42 is recognized.

Figure 13:
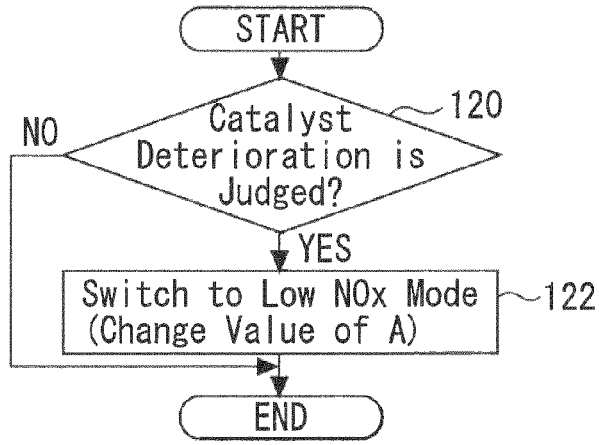
FIG. 13 is a block diagram to explain the details of the control that is carried out by the ECU in a seventh embodiment of the present invention.

FIG. 13 is a flowchart of the routines executed by the ECU50 to realize the above described function. In the routine shown in FIG. 13, a deterioration judgment of catalyst 42 is performed by a known technique, firstly (step 120). When deterioration of the catalyst 42 is not recognized by the result, the present cycle is terminated.

The weighting coefficient "A" is set by an initialization processing to an optimum value that is determined by taking the balance between the emission characteristic and the power characteristics into consideration. In a case where the deterioration of the catalyst 42 is not recognized in the above step 120, the condition of the internal combustion engine 10 is controlled so that the above described balance is kept because the weighting coefficient "A" is held as the initialized value.

When the deterioration of the catalyst 42 is judged in the above step 120, switching to a low NOx mode is performed (step 122). More concretely, the weighting coefficient "A" is changed to a smaller value by just a predetermined value. According to the expression (10), the smaller the weighting coefficient "A" is, the more important that the [NOx] is gotten closer to the target value "a" becomes for minimizing the evaluation value J. Because of this, after the above treatment is executed, the internal combustion engine 10 is driven in a condition in which much importance is put in the emission characteristic, whereby the NOx quantity exhausted from the internal combustion engine 10 decreases.

As explained above, the system of the present embodiment can reduce the NOx quantity to be purified by the catalyst 42 by raising the control accuracy of the NOx under a situation in which the catalyst 42 is deteriorated. The system of the present embodiment, therefore, can sufficiently suppress the NOx emission into the atmosphere of without being concerned with the deterioration of the catalyst 42.

Although the switching processing to the low NOx mode is executed in the system of the fourth embodiment when the catalyst 42 is deteriorated in the above described seventh embodiment, the combination is not limited to this. That is, the switching processing to the low NOx mode executed when the catalyst 42 is deteriorated may be combined with the system of the fifth embodiment. In the system of the fifth embodiment, the NOx suppression portion 62 calculates the NOx correction coefficient KNOx by the expression of KNOx=γ·ΔNOx. In this case, it is possible to reduce the NOx emission quantity by enlarging the importance of getting the ΔNOx (the difference between the [NOx] and the target value "a") smaller by changing the coefficient γ to a larger value.

It should be noted that, in the above described seventh embodiment, the "catalyst deterioration judgment means" in the tenth aspect of the present invention is realized by the ECU50 performing the treatment of step 120. Further, in the present embodiment, the "deterioration countermeasure means" in the tenth aspect of the present invention is realized by the ECU50 performing the treatment of step 122.

Eighth Embodiment

Next, eighth embodiment of the present invention will be described with reference to FIG. 14. The system of the present embodiment can be realized by employing a NOx occlusion catalyst as the catalyst 42 and making the ECU 50 the routine shown in FIG. 14 described later in the system of the fourth embodiment.

The NOx occlusion catalyst can occlude NOx included in exhaust gas within the occlusion capacity. Further, the NOx occlusion capacity of the NOx occlusion catalyst can be reproduced by making the exhaust air fuel ratio be temporally rich, i.e., by performing the so-called rich spike control. According to the system of the present embodiment, therefore, it is possible to permanently prevent the NOx from being emitted into the atmosphere by performing the rich spike control at every time when the NOx quantity occluded in the catalyst 42 reaches near the occlusion capacity.

The rich spike control is accompanied with torque fluctuation, thus being preferable not to be executed under a situation such as the acceleration scene or the fuel cut scene in which torque fluctuation should not occur. However, since the execution of the rich spike control is required on a stage where the NOx occlusion quantity of the catalyst 42 reaches in the vicinity of an upper limit, a situation in which the catalyst 42 can not occlude the entire NOx, whereby NOx is emitted into the atmosphere may occur if the rich spike control is prohibited under a situation in which the requirement thereof arises. Thus, in the present embodiment, it is decided that a small value is set as the weighting coefficient "A" under such a situation so as to suppress the NOx quantity exhausted from the internal combustion engine 10.

Figure 14:
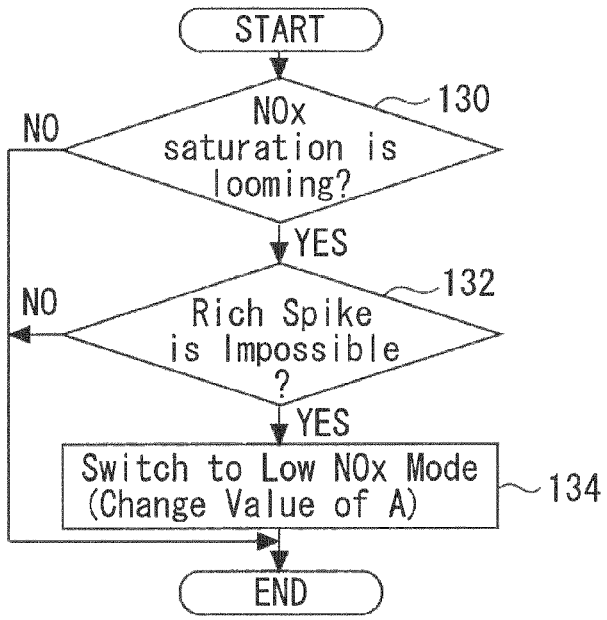
FIG. 14 is a block diagram to explain the details of the control that is carried out by the ECU in an eighth embodiment of the present invention.

FIG. 14 is a flowchart of the routines that is executed by the ECU50 in the present embodiment to realize the above described function. In the routine shown in FIG. 14, it is determined firstly whether NOx saturation in the catalyst 42 is looming (step 130). The ECU50 is calculating the NOx quantity exhausted from the internal combustion engine 10, i.e., the NOx quantity flowing into the catalyst 42 based on the exhaust air fuel ratio A/F and the intake air quantity Ga by a known technique. Further, the ECU50 is calculating the NOx occlusion quantity in the catalyst 42 by summing the NOx quantity. In the present step 130, concretely, it is determined that the NOx saturation is looming when the NOx occlusion quantity reaches the saturation judgment value (value slightly smaller than the NOx occlusion capacity of the catalyst 42).

When it is determined that the NOx saturation of the catalyst 42 is not looming by the above mentioned processing, the present processing cycle is terminated immediately. On the other hand, if it is determined that the NOx saturation of the catalyst 42 is looming, judgment is made whether it is impossible to execute the rich spike control, next (step 132). Conditions (acceleration scene or the like) under which the rich spike control should be prohibited is stored in the ECU50. In this step, concretely, judgment is made whether the condition of the internal combustion engine 10 meets the prohibiting conditions.

When it is determined that the rich spike control can be executed by the above mentioned processing, the present processing cycle is terminated immediately. In this case, the rich spike control is executed by other routine so that the NOx occlusion capacity is restored.

On the other hand, if it is determined in the above step 132 that it is impossible to execute the rich spike control, switching to the low NOx mode is executed (step 134). Concretely, the weighting coefficient "A" is reduced by a predetermined value so that the importance of making the [NOx] agree with the target value "a" is raised (see the above described expression (10)). As a result, NOx quantity exhausted from the internal combustion engine 10 decreases, whereby the time before the catalyst 42 reaches NOx saturation is prolonged. The situation in which execution of the rich spike control should be prohibited usually finishes in a short time. According to the above treatment, therefore, the NOx release into the atmosphere due to the prohibition of the rich spike control execution can be substantially prevented.

As explained above, even if the prohibition of the rich spike control execution is decided under a specific situation such as an acceleration scene, the system of the present embodiment can prevent the NOx from being released into the atmosphere due to the prohibition of the execution. Thus, according to the system of the present embodiment, the execution of the rich spike control under the situation in which torque fluctuation should not occur can be prohibited, and the deterioration of the emission characteristics due to the prohibition of the execution can be minimized.

Although the treatment to move the internal combustion engine 10 to the low NOx mode is executed in the system of the fourth embodiment in the above described eighth embodiment, the combination is not limited to this. That is, the treatment for implementing the switching to the low NOx mode may be combined with the system of the fifth embodiment (the low NOx mode may be implemented by changing the coefficient γ to a larger value.).

It should be noted that the "purification available capacity estimation means" in the eleventh aspect of the present invention is realized by the ECU50 performing the treatment of step 130 in the above described eighth embodiment. Further, the "reproducing means" in the eleventh aspect of the present invention is realized by the ECU50 performing the rich spike control. Furthermore, the "execution permission-prohibition determining means" in the eleventh aspect of the present invention is realized by the ECU50 performing the treatment of step 132. Moreover, the "reproduce impossibility countermeasure means" in the eleventh aspect of the present invention is realized by the ECU50 performing the treatment of step 134.

Ninth Embodiment

Next, ninth embodiment of the present invention will be described with reference to FIG. 15. The system according to the present embodiment can be implemented by controlling the VVT 20 by a technique described later.

Figure 15:
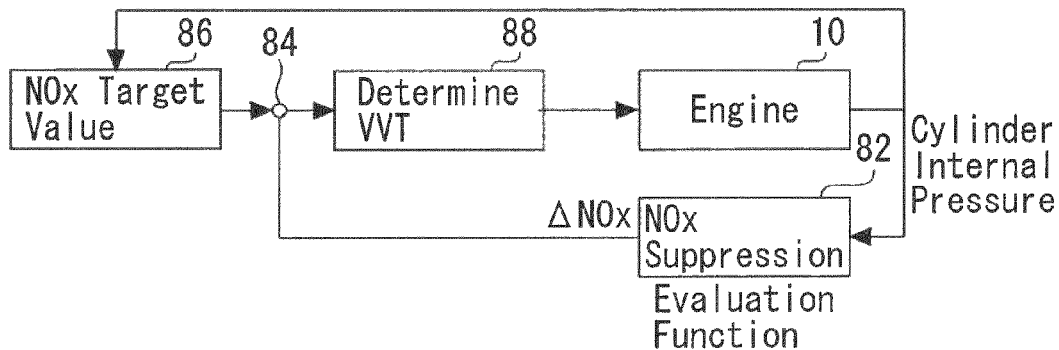
FIG. 15 is a block diagram to explain the details of the control that is carried out by the ECU in a ninth embodiment of the present invention.

FIG. 15 is a block diagram to explain the details of the control that is carried out by the ECU 50 in the present embodiment. All of the constituent elements shown in FIG. 15 are realized by the ECU50 performing a control program stored therein.

As shown in FIG. 15, an NOx suppression portion 82 is provided in the ECU50, in the present embodiment. The NOx suppression portion 82 calculates the NOx correction value KNOx ($=\gamma \cdot ([NOx]-a)$) which corresponds to the difference between the NOx concentration estimated value [NOx] and the target value "a" as same as the NOx suppression portion 62 in the above described fifth embodiment (see, FIG. 11) does.

The NOx correction value KNOx is supplied to an adder portion 84. The adder portion 84 is also supplied with the NOx target value "a" from an NOx target value instructing portion 86. The NOx target value instructing portion 86 calculates the above described target value "a" based on a driving condition of the internal combustion engine 10. The adder portion 84 supplies a value (referred to as a "VVT instruction value" hereinafter) that is obtained by adding the NOx correction value KNOx to the target value "a" to a VVT determination portion 88. The VVT determination portion 88 calculates a control quantity of the VVT20 at the intake side based on the above described VVT instruction value so as to supplies the value to the VVT20.

According to the construction shown in FIG. 15, the larger the NOx concentration estimated value [NOx] compare to the target value "a", the larger the VVT instruction value supplied to the VVT determination portion 88. In this case, the VVT determination portion 88 requires a bigger advance angle to the VVT20.

In the internal combustion engine 10, when the opening timing of the intake valve 18 is advanced, the period in which the intake valve 18 and the exhaust valve 22 open simultaneously, i.e., so-called valve overlap period is extended. When the valve overlap period is prolonged, backward flow quantity of exhaust gas flowing from the exhaust path 14 to the intake path 12 increases, whereby the residual gas quantity (internal EGR quantity) in the cylinder increases. Then, if the residual gas quantity in the cylinder increases, temperature rising rate of the in-cylinder gas becomes gentle so that the NOx produced quantity is suppressed.

Due to the foregoing reason, the system of the present embodiment can shift the NOx concentration estimated value [NOx] closer to the target value "a" by adjusting the valve overlap period. Because of this, the system of the present embodiment can bring the ignition timing SA closer to the MBT as compared to the case of any one of the first to eighth embodiments described above. Thus, the system of the present embodiment can achieve both of the requirement as for the power characteristic and the requirement as for the exhaust emission in good balance with higher levels as compared to that of those embodiments.

Although the valve overlap period is prolonged in the above described ninth embodiment by advancing the valve opening timing of the intake valve 18, the technique is not limited to this. That is, the valve overlap period may be prolonged by retarding the valve closing timing of the exhaust valve 22.

Further, although the above described ninth embodiment changes the residual gas quantity in the cylinder by changing the valve overlap period, the technique is not limited to this. That is, the residual gas quantity in the cylinder may be changed by changing external EGR quantity.

It should be noted that the VVT20 in the above described ninth embodiment corresponds to the "variable valve timing mechanism" in the thirteenth aspect of the present invention. Further, in the present embodiment, the NOx suppression portion 82, adder portion 84 and VVT determination portion 88 correspond to the "control means" in the thirteenth aspect of the present invention.

Tenth Embodiment

Next, tenth embodiment of the present invention will be described with reference to FIGS. 16 to 18. The system of the present embodiment can be realized by making the ECU50 estimate the [NOx] by a simplified calculation employing the MFB.

In the above described first embodiment, the ECU 50 calculates the NOx concentration estimated value [NOx] according to the expression (4). In this case, the ECU 50 performs the integral calculation of $V \cdot dP/d\theta$. In a case where the ECU50 performs such a calculation, a problem that calculation load grows too much would arise if the $d\theta$ is too small. Conversely, when the $d\theta$ is too large, the calculated value becomes vibrational due to noise exerted on the sensor, whereby it becomes easy for the finally calculated integration result to be superimposed with large fluctuation. Consequently, the present embodiment proposes a technique to obtain the [NOx] by a simplified calculation employing the MFB instead of the integral calculation of V·dP/dθ.

Figure 16:
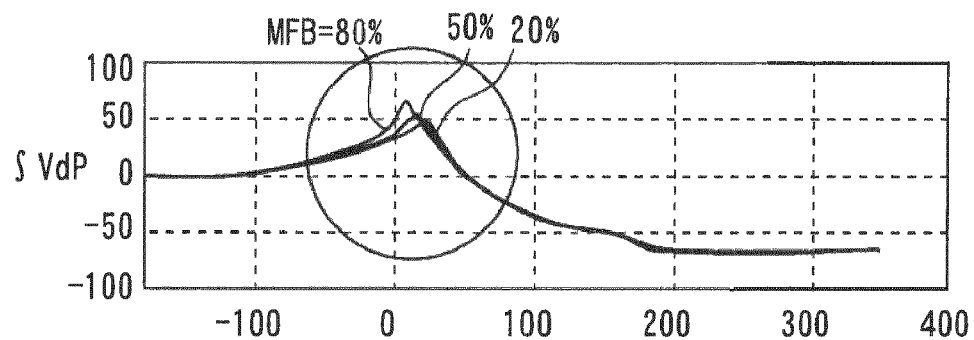
FIG. 16 is a drawing which shows a relationship between $\int V/dP$ and crank angle $\theta$ using $MFB_{@ATDC8}$ as a parameter.

FIG. 16 is a drawing which shows a relationship between ∫V/dP and crank angle θ using the $MFB_{169\ ATDC8}$ as a parameter. More concretely, the three wave forms shown in FIG. 16 represent the relationships between the ∫V·dP/dθ and crank angle under situations in which the internal combustion engine 10 is driven so that the $MFB_{@ATDC8}$ becomes, in turn from the top, 80%, 50% and 20%.

Figure 17:
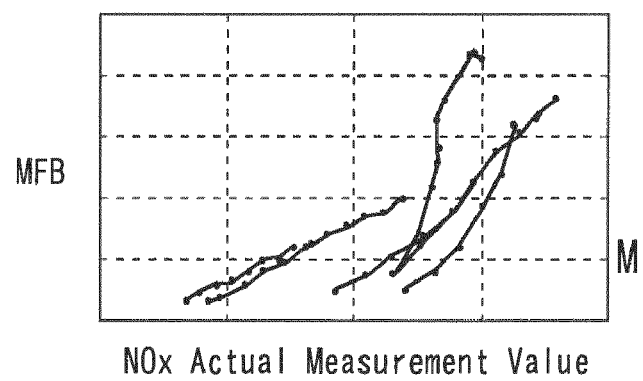
FIG. 17 shows a relationship between an actual measurement value of concentration of NOx exhausted from an internal combustion engine and the $MFB@_{ATDC8}$.

FIG. 17 shows a relationship between an actual measurement value of the concentration of NOx exhausted from the internal combustion engine and the $MFB@_{ATDC8}$. Each of the plurality of solid lines shown in FIG. 17 is formed by tying results obtained under a plurality of situations in which the engine revolution number NE and the load ratio KL are made the same. All of these results show that an approximately proportional relationship is formed between the $MFB_{@ATDC8}$ and the NOx concentration.

Figure 18:
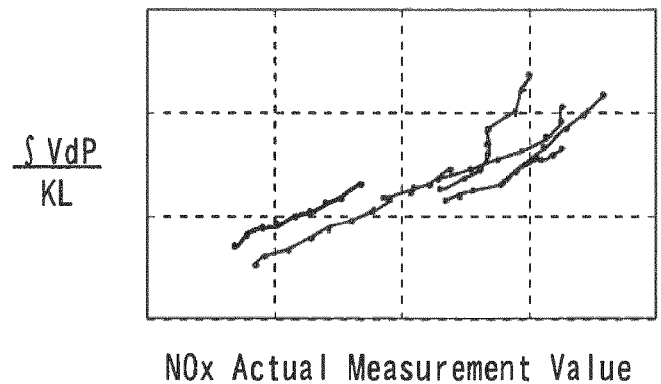
FIG. 18 shows a relationship between the actual measurement value of NOx concentration and $(\int V \cdot dP)/KL$.

FIG. 18 shows a relationship between the actual measurement value of NOx concentration and the (∫V·dP)/KL. Each of the plurality of solid lines shown in FIG. 18 is formed by tying results obtained under a plurality situations in which the engine revolution number NE and the load ratio KL are made the same. All of these results show that an approximately proportional relationship is formed between the actual measurement value of NOx concentration and the (∫V·dP)/KL.

Further, the results shown in FIG. 17 and FIG. 18 indicate that the $MFB_{@ATDC8}$ and the (∫V/dP)/KL show the same correlation with the actual measured value of NOx. Because of this, the term $(\Sigma V \cdot dP/d\theta \cdot \Delta\theta)/KL$ in the expression (4) can be replaced with $MFB_{@ATDC8}$. In other words, the NOx concentration estimated value [NOx] can be calculated by the next expression by using $MFB_{@ATDC8}$. It should be noted that the g(KL) in the following expression is a value that is obtained by multiplying an adaptation constant with the correction coefficient f(KL) each other.

$$[NOx] = MFB_{@ATDC8} \times g(kl) \quad (12)$$

$MFB_{@ATDC8}$ can be easily calculated as compared to the integral calculation of V·dP/dθ by using a well-known simplified technique (PVΛκ) (see, for example, Japanese Patent Laid-Open No. 2005-36754). Thus, According to the above described expression (12), it is possible to sufficiently reduce the calculation load for the [NOx] as compared to a case in which the expression (4) is used. The system according to the present embodiment can sufficiently lighten the calculation load for calculating the fluctuation-less [NOx] as compared to the case of the first embodiment.

In the above described tenth embodiment, although the calculation expression (4) of the first embodiment is simplified by using the $MFB_{@ATDC8}$, the object which can be simplified is not limited to this. That is, the calculation expression (5) of the second embodiment may be simplified by the $MFB_{@ATDC8}$ while executing a similar substitution.

Figure 19:
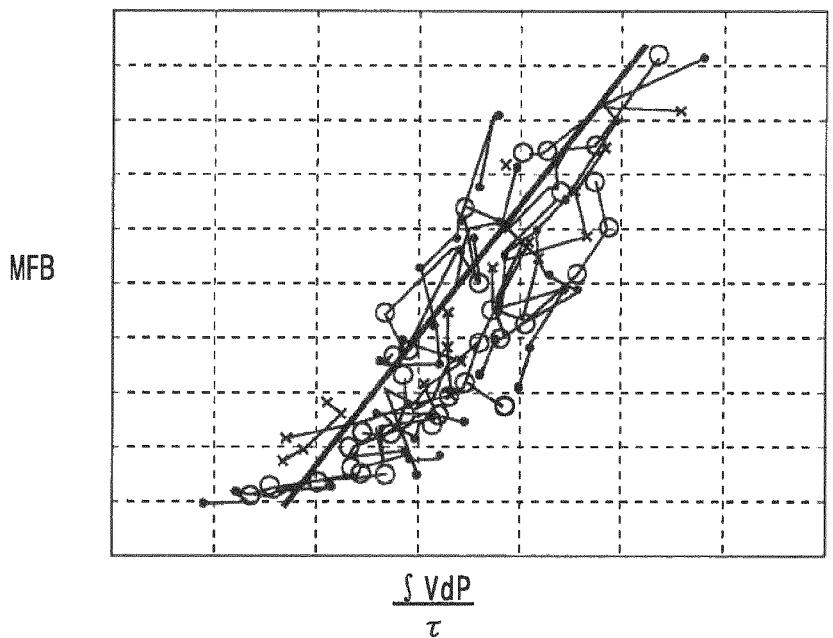
FIG. 19 is a drawing which shows a correlation between $(\int V/dP)/\tau$ and $MFB@_{ATDC8}$.

Besides, the expression (6) of the third embodiment may be simplified by the $MFB_{@ATDC8}$ by replacing the term of $(\Sigma V \cdot dP/d\theta \cdot \Delta\theta)/\tau$ with the $MFB_{@ATDC8}$. FIG. 19 is a drawing which shows a correlation between the (∫V·dP)/τ and the $MFB_{@ATDC8}$. It should be noted that the plurality of solid lines shown in FIG. 19 are formed by tying results obtained under a plurality of situations in which the engine revolution number NE and the load ratio KL are made the same. As shown in FIG. 19, a proportional relationship is provided between the (∫V·dP)/τ and the $MFB_{@ATDC8}$. Because of this, almost the same result can be obtained by the simplified calculation using the $MFB_{@ATDC8}$, according to the above described substitution.

It should be noted that the ECU 50 in the above described embodiment 10 corresponds to the "MFB calculating means" in the fourteenth aspect of the present invention when calculating the $MFB_{@ATDC8}$. Further, in the present embodiment, the "internal energy correlation value calculating means" in the fourteenth aspect of the present invention is realized when the $MFB_{@ATDC8}$ is replaced with the $(\Sigma V \cdot dP/d\theta \cdot \Delta\theta)/KL$ in the expression (4) or (5), or the $(\Sigma V \cdot dP/d\theta \cdot \Delta\theta)/\tau$ in the expression (6), and the ECU 50 performs the calculation processing.

Eleventh Embodiment

Next, eleventh embodiment of the present invention will be described with reference to FIGS. 20 through 22. The system according to the present embodiment can be implemented by making the ECU 50 calculates the NOx concentration estimated value [NOx] according to the expression (13) described later, in the configuration shown in FIG. 1.

The expression (6) used in the third embodiment provides the following expression (13) when being expanded and approximated. In this regard, δ and ε in the expression (13) are constants, respectively.

$$[NOx] = \alpha \times \frac{\left(\sum_{\theta_1}^{\theta_2} V_\theta \frac{dP_\theta}{d\theta} \Delta\theta\right) \times f(Pm)}{\tau} \quad (13)$$

$$= \delta \frac{P_{\theta_1} V_{\theta_1} - P_{\theta_2} V_{\theta_2}}{\tau} + \varepsilon$$

According to the expression (13), all things to calculate the NOx concentration estimated value [NOx] are only detecting cylinder internal pressure $P_{\theta 1}$ and in-cylinder volume $V_{\theta 1}$ that come up when crank angle θ=θ1 as well as cylinder internal pressure $P_{\theta 2}$ and in-cylinder volume $V_{\theta 2}$ that come up when crank angle θ=θ2, and executing calculation using them just once. Thus, the calculation load of the ECU 50 can be largely reduced when the operational expression for the [NOx] is replaced from the above described expression (6) to the expression (13).

Figure 20:
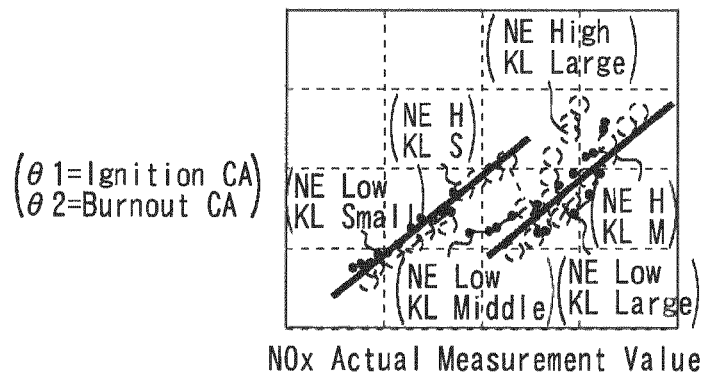
FIG. 20 shows a relationship between a result calculated by the expression (13) under a condition in which $\theta_1$ is set to the ignition crank angle and $\theta_2$ is set to the burnout crank angle.

FIG. 20 shows a relationship between a result calculated by the expression (13) under a condition in which $\theta_1$ is set to the ignition crank angle and $\theta_2$ is set to the burnout crank angle as is the cases with the first to the third embodiments. More concretely, the results shown by (•) in FIG. 20 shows relationships that are obtained by changing the load ratio KL in three steps of small, middle and large, while keeping the engine revolution number NE at 1500 rpm. Further, the results shown by (○) in FIG. 20 shows relationships that are obtained by changing the load ratio KL in three steps of small, middle and large, while keeping the engine revolution number NE at 2000 rpm.

The results shown in FIG. 20 show the following tendencies.

i) The [NOx] obtained by the expression (13) and the actual measurement value of NOx show an almost proportional relationship under every driving condition.

ii) High or low of the engine revolution number NE does not affect much the relationship between the [NOx] obtained by the expression (13) and the actual measurement value of NOx.

iii) Offset corresponding to the load ratio KL is superimposed on the relationship between the [NOx] obtained by the expression (13) and the actual measurement value of NOx.

The offset superimposed corresponding to the every load ratio KL can be specified in the internal combustion engine 10. Accordingly, the correction value for cancelling the offset can be predetermined for the every KL. Thus, the ECU50 can calculate the NOx concentration estimated value [NOx] accurately by firstly calculating the [NOx] using the expression (13), and then giving a correction depending on KL to the calculated result. Further, according to such a processing, it is possible to largely reduce the calculation load for obtaining the [NOx] as compare to the case of the above described first to third embodiments.

Now, the applicant of the present invention has been found out that it becomes possible to improve the estimation accuracy of the [NOx] and cancel the offset shown in FIG. 20 by changing the integral subjected interval in the expression (13) (i.e., $\theta_1$ and $\theta_2$) as follows.

$\theta_1$: The crank angle CApmax at which the in-cylinder pressure is maximized, and $\theta_2$: Expansion bottom dead center. (14)

Figure 21:
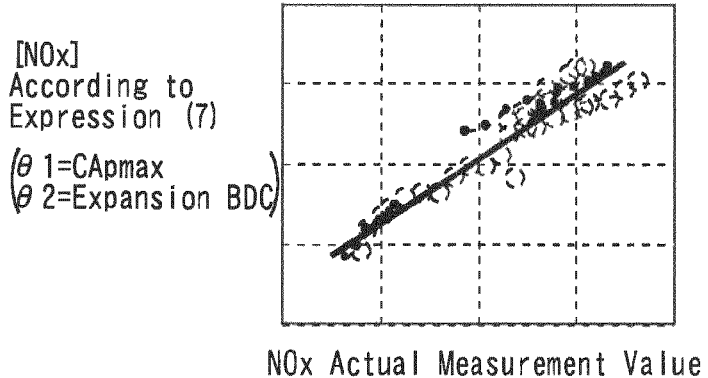
FIG. 21 shows a result which is obtained by performing the calculation according to the expression (13) while changing the $\theta_1$ and $\theta_2$ to settings of (14)

FIG. 21 shows a result which is obtained by performing the calculation according to the expression (13) while changing the $\theta_1$ and $\theta_2$ to the settings of (14). As shown in FIG. 21, the [NOx] and the actual measurement value of the NOx concentration show an approximately proportional relationship under all driving conditions in this case regardless of whether the engine revolution number NE is high or low, or whether the load ratio KL is large or small. Thus, it becomes possible to obtain the [NOx] accurately without performing a correction for canceling the offset when the calculation of the expression (13) is executed under a setting of (14).

The $\theta_2$ used in the setting of (14) is always constant regardless of the driving condition of the internal combustion engine 10. In contrast, the other crank angle $\theta_1$=CApmax used in the setting of (14) varies depend on the driving condition of the internal combustion engine 10. Because of this, it is necessary to search the CApmax during every expansion stroke to perform the calculation of the expression (13) under the setting of (14).

Figure 22:
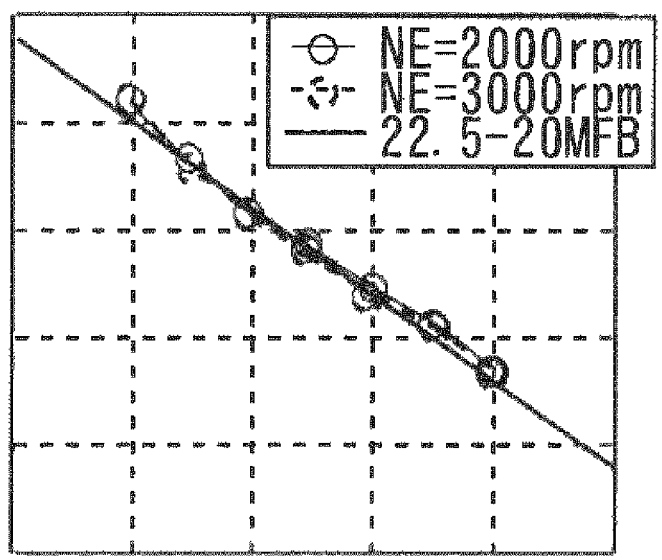
FIG. 22 is a drawing which shows a relationship between $MFB@_{ATDC8}$ and CApmax.

FIG. 22 is a drawing which shows a relationship between the MFB$@_{ATDC8}$ and the CApmax. As shown in FIG. 22, the MFB$@_{ATDC8}$ and the CApmax show a proportional relationship. The MFB$@_{ATDC8}$, therefore, can be used as a characteristic value of the CApmax. Further, the MFB$@_{ATDC8}$ can be comparatively easily calculated by using a simple known technique (PVΛκ) as stated above.

In the present embodiment, the ECU50 stores a rule for converting the MFB$@_{ATDC8}$ into the CApmax. Further, the ECU50 calculates the MFB$@_{ATDC8}$ during every expansion stroke so as to convert the calculated value into the CApmax. Further, the ECU50 detects the in-cylinder pressure $P_{\theta 1}$ and the in-cylinder volume $V_{\theta 1}$ using the CApmax calculated in the above described way as the $\theta_1$, while detecting the in-cylinder pressure $P_{\theta 2}$ and the in-cylinder volume $V_{\theta 2}$ at the expansion bottom dead center $\theta_2$. Afterwards, the ECU50 calculates the NOx concentration estimated value [NOx] by performing the calculation of the expression (13) based on the above described variables.

According to the above described treatment, it is possible to accurately calculate the NOx concentration estimated value [NOx] by a simple calculation processing. Because of this, the system of the present embodiment can sufficiently reduce the calculation load to precisely calculate the NOx concentration estimated value [NOx] as compare to cases of the above described other embodiments.

Although the [NOx] is calculated while using the approximate expression (13) that is based on the expression (6) in the above described embodiment 11, the present invention is not limited to this. That is, the approximate expression to calculate the [NOx] may be an expression that is obtained by expanding and approximating the expression (4) used in the first embodiment or an expression that is obtained by expanding and approximating the expression (5) used in the second embodiment.

Further, although the correction for canceling the offset shown in FIG. 20 is determined to be omitted in the above described eleventh embodiment by performing the calculation of the expression (13) under the setting of (14), the present invention is not limited to this. That is, the calculation of (13) may be executed while setting the ignition crank angle to $\theta_1$ and the burnout crank angle to $\theta_2$, then the correction to cancel the offset shown in FIG. 20 may be given to the calculated result.

Twelfth Embodiment

[Feature of Twelfth Embodiment]

Next, twelfth embodiment of the present invention will be described with reference to FIG. 23. The system of the present embodiment can be realized by giving the ECU 50 function to calculate the [NOx] according to the above described expression (13) and making the ECU 50 execute a routine shown in FIG. 23 described later in the system of the fourth embodiment.

As stated above, the calculation according to the expression (6) is accompanied with great operation load. On the other hand, the operation load accompanied with the calculation of the [NOx] can be reduced according to the expression (13). However, the operation accuracy of the [NOx] becomes sufficiently high when the expression (6) is used as compared to when the expression (13) is used, since the expression (13) is a merely approximate expression of the expression (6).

Both of the calculation of the expression (6) and the calculation of the expression (13) are required to be executed during every expansion stroke. Thus, the calculation processing of the [NOx] is required to be repeated so as to be synchronism with the crank angle of the internal combustion engine 10 regardless that either operational expression is used. In this situation, it is possible to execute a comparatively complicated operation in a low revolution region, since the time period of one cycle is long. On the other hand, it becomes difficult to execute a complicated operation in a high revolution region, because the time period of the cycle becomes short. Thus, it is determined in the present embodiment that the expression (6) is used as the operational expression for the [NOx] (6) in the low revolution region and the operational expression is changed to the expression (13) in the high revolution region.

[Concrete Treatment in Twelfth Embodiment]

Figure 23:
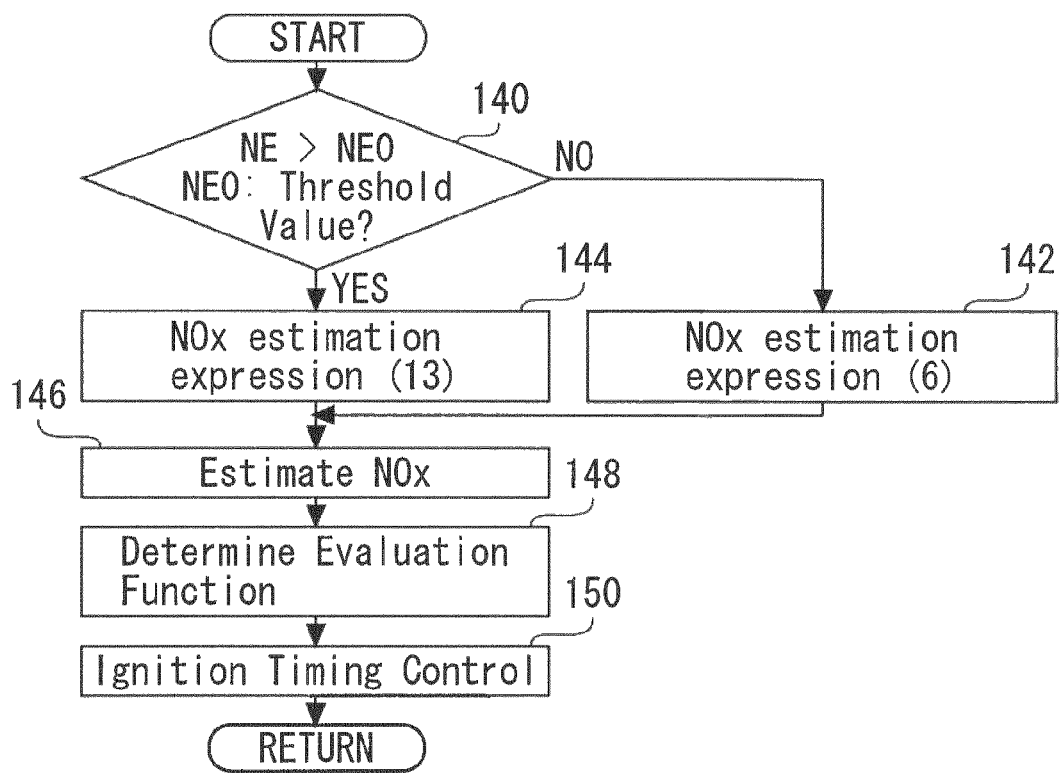
FIG. 23 is a flowchart of a routine that is carried out by the ECU in the twelfth embodiment of the present invention.

FIG. 23 is a flowchart of a routine that is carried out by the ECU 50 in the present embodiment. In the routine shown in FIG. 23, it is determined whether engine revolution number NE exceeds a threshold value NE0, firstly (step 140). The threshold value NE0 is the upper limit until which it is possible to calculate the [NOx] according to the expression (6).

When the judgment of NE>NE0 is denied in the above mentioned treatment, it can be determined that the calculation of the expression (6) is possible since the engine revolution number NE is low. In this case, the technique according to the expression (6) is selected as the technique for calculating the NOx concentration estimated value [NOx] (step 142).

On the other hand, when it is judged that NE>NE0 is formed, it can be determined that the calculation of the [NOx] according to the expression (6) is difficult since the engine revolution number NE is high. In this case, the technique according to the expression (13) is selected as the technique for calculating the NOx concentration estimated value [NOx] (step 144).

Next, the NOx concentration estimated value [NOx] is calculated by the technique specified by the above described treatment (step 146). The estimation technique according to the expression (6) and the estimation technique according to the expression (13) are identical to those in the third embodiment and the eleventh embodiment, respectively.

Afterwards, the evaluation function J is determined by the same technique in the case of the fourth embodiment (step 148), before the ignition timing is controlled (step 150). Concretely, these treatments are realized by the ECU50 performing a routine shown in FIG. 10.

According to the above mentioned treatment, it is possible to accurately calculate the [NOx] by the operational processing using the expression (6) in the low revolution region. Further, it is possible to avoid the calculation load of the ECU 50 being too large in the high revolution region by changing the operational expression for the [NOx] from the expression (6) to the expression (13). Because of this, the system of the present embodiment can calculate the [NOx] with an appropriate accuracy in all operating ranges of the internal combustion engine 10 without providing excessive operational capability to the ECU50.

It should be noted that the crank angle sensor 36 in the above described twelfth embodiment 12 accords with the "revolution number sensor" in the fifteenth aspect of the present invention. Further, the "first calculating means" in the fifteenth aspect of the present invention and the "second calculating means" in the fifteenth aspect of the present invention are realized by the ECU 50 calculating the NOx concentration estimated value [NOx] by the technique using the expression (6) and calculating the NOx concentration estimated value [NOx] by the technique using the expression (13), respectively. Even more particularly, the "calculation technique selecting means" in the fifteenth aspect of the present invention is realized by the ECU50 performing the processing of step 140.

Thirteenth Embodiment

[Feature of Thirteenth Embodiment]

Figure 24:
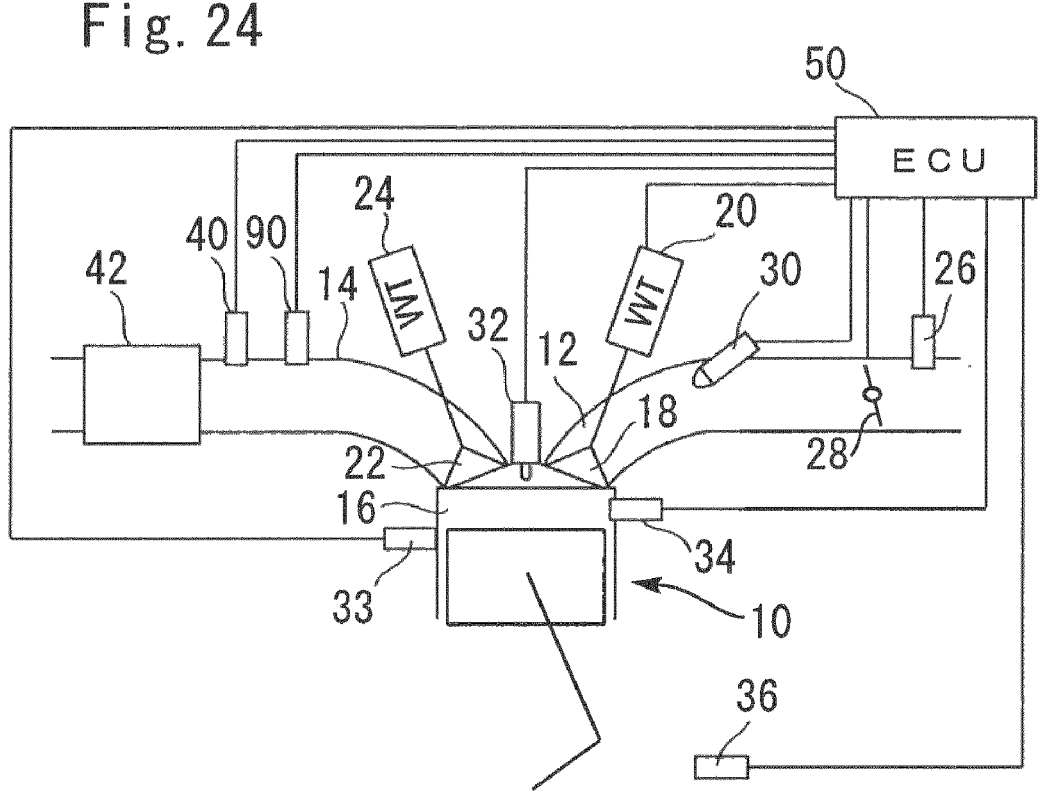
FIG. 24 is a diagram for explaining the configuration of a system according to a thirteenth embodiment of the present invention.

Next, thirteenth embodiment of the present invention will be described with reference to FIGS. 24 and 25. FIG. 24 is a diagram for explaining the configuration of a system according to the present embodiment. The configuration shown in FIG. 24 is similar to the configuration of shown in FIG. 1 except that an NOx concentration sensor 90 is added to the exhaust path 14. The system of the present embodiment can be realized by making the ECU50 perform a routine shown in FIG. 25 discussed below in the configuration shown in FIG. 24.

The system of the present embodiment calculates the NOx concentration estimated value [NOx] by any one of the techniques according to the first to eleventh embodiments. In this case, the [NOx] can be calculated for every expansion stroke, i.e., for each cylinder. The internal combustion engine 10 has a plurality of cylinders. In the present embodiment, it is determined that the ECU50 calculates the [NOx] for each of the plurality of cylinders.

Usually, components of the exhaust gas are not greatly different among the plurality of cylinders. Accordingly, the judgment whether the [NOx]s each of which is calculated for each of the plurality of cylinders are correctly calculated can be done by comparing the [NOx]s each other. Further, if the detection value of the NOx concentration sensor 90 is compared with the [NOx], it becomes possible to determine whether both of them are normal.

[Concrete Treatment in Thirteenth Embodiment]

Figure 25:
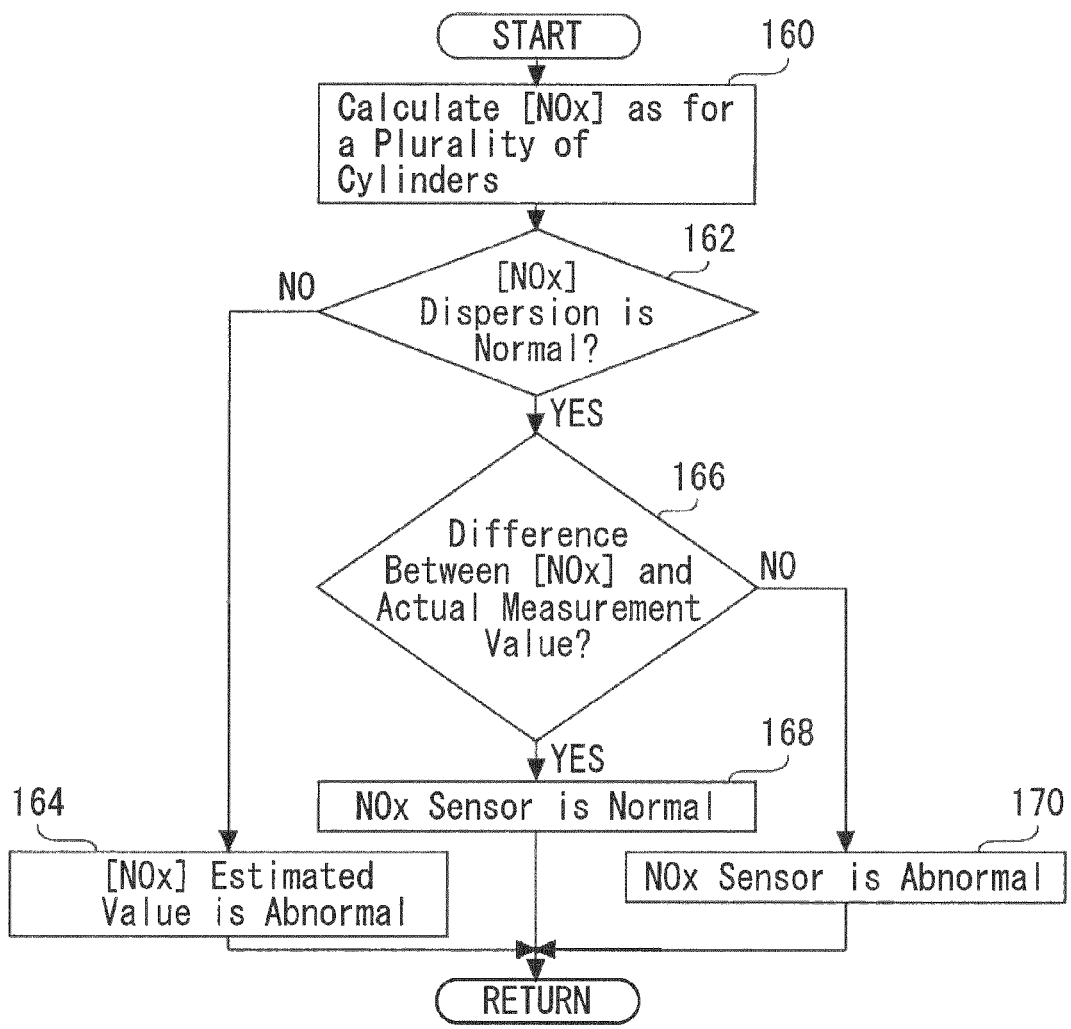
FIG. 25 is a flowchart of a routine that is carried out by the ECU in the thirteenth embodiment of the present invention.

FIG. 25 is a flowchart of a routine that is carried out by the ECU to determine whether the [NOx] is correctly calculated and the NOx concentration sensor 90 functions normally according to the principle discussed above. In the present routine, NOx concentration estimated value [NOx] for each of the plurality of cylinders included in the internal combustion engine 10 is calculated firstly (step 160). Here, the calculation technique for the [NOx] may be any one used in the above described first to eleventh embodiments.

Next, it is determined whether [NOx]s of the plurality of cylinders are within the limit of the dispersion that can be considered to be normal (step 162). To be concrete, an average value of all [NOx]s is calculated at first. Next, judgment is made in turn for each [NOx] whether difference quantity from the average value exceeds a judgment value. As a result, if any [NOx] is recognized to be accompanied with a difference quantity exceeding the judgment value, it is determined that the dispersion of the [NOx] is not normal. In this case, abnormality of the [NOx] estimation is recognized (step 164) before the present processing cycle is terminated. It should be noted that the technique described above is a merely example of techniques to determine the dispersion of the [NOx], and the technique is not limited to this.

In contrast, when it is judged in the above step 162 that the dispersion of the [NOx] is normal, the average value of the [NOx] is compared with the detection value of the NOx concentration sensor 90, next (step 166). To be concrete, it is judged whether the difference quantity between the both is within the normal value. When the above judgment is denied as a result, the NOx concentration sensor 90 is judged to be normal (step 168) before the present processing cycle is terminated.

On the other hand, when it is judged that the average value of the [NOx] is different from the detection value of the NOx concentration sensor 90 more than the judgment value, the NOx concentration sensor 90 is judged to be abnormal (step 170). According to the above mentioned treatment, it is possible to accurately judge whether the estimation of the [NOx] is performed normally and the NOx concentration sensor 90 functions normally by merely simple processing of comparing.

It should be noted that the "abnormality judgment means" in the sixteenth aspect of the present invention is realized by the ECU50 performing the processing of step 166 in the above described thirteenth embodiment. Further, the "internal energy correlation value calculating means" and the "NOx concentration estimation means" in the seventeenth aspect of the present invention are realized by the ECU50 performing the processing of step 160. Moreover, the "right or wrong judgment means" in the seventeenth aspect of the present invention is realized by the ECU50 performing the processing of step 162.

The invention claimed is:
1. A control device of an internal combustion engine, comprising:
a cylinder internal pressure sensor detecting a cylinder internal pressure of the internal combustion engine;

internal energy correlation value calculating means for calculating an internal energy correlation value having correlation with internal energy consumed in the cylinder based on the cylinder internal pressure;

a correcting means to correct the internal energy correlation value based on characteristics that an increasing rate of the internal energy correlation value becomes gentler when a load ratio of the internal combustion engine exceeds a predetermined value, the correcting means for not performing the correcting of the internal energy correlation value when the load ratio is less than or equal to the predetermined value and decreasing the increasing rate of the internal energy correlation value as the load ratio becomes large when the load ratio exceeds the predetermined value; and NOx concentration estimation means for calculating an NOx concentration estimated value in exhaust gas based on the internal energy correlation value which is corrected by the correcting means, wherein said internal energy correlation value calculating means includes an MFB calculating means for calculating an MFB as said internal energy correlation value based on said cylinder internal pressure, said MFB indicating a ratio of combustion terminated before arrival of a specific crank angle after a beginning of an expansion stroke.

2. The control device of an internal combustion engine according to claim 1, further comprising intake air quantity detecting means for detecting an intake air quantity of the internal combustion engine, wherein said NOx concentration estimation means includes:

NOx quantity calculating means for calculating NOx emission quantity exhausted by the internal combustion engine based on the internal energy correlation value; and standardizing means for calculating said NOx concentration estimated value by standardizing said NOx emission quantity with said intake air quantity.

3. The control device of an internal combustion engine according to claim 1, further comprising intake air quantity detecting means for detecting an intake air quantity of the internal combustion engine, wherein said NOx concentration estimation means includes correction means which corrects said NOx concentration estimated value so as to become lower as the intake air quantity increases.

4. The control device of an internal combustion engine according to claim 1, further comprising air fuel ratio detecting means for detecting air fuel ratio of air/fuel mixture burning in a cylinder, wherein said NOx concentration estimation means comprises correction means which corrects the NOx concentration estimated value so as to be higher as the air fuel ratio becomes leaner.

5. The control device of an internal combustion engine according to claim 1, further comprising residual gas quantity correlation value detecting means for detecting a residual gas quantity correlation value having a correlation with a quantity of residual gas remaining in a cylinder after exhaust stroke, wherein said NOx concentration estimation means comprises correction means which corrects the NOx concentration estimated value so as to be lower as said residual gas quantity is estimated to be large based on said residual gas quantity correlation value.

6. The control device of an internal combustion engine according to claim 5, further comprising intake air quantity detecting means for detecting an intake air quantity of the internal combustion engine, wherein said correction means corrects said NOx concentration estimated value to be lower as the sum of said intake air quantity and said residual gas quantity is estimated to be large.

7. The control device of an internal combustion engine according to claim 1, further comprising:

control means for controlling the internal combustion engine so that said NOx concentration estimated value approaches an NOx concentration target value; and NOx concentration target value setting means for setting said NOx concentration target value based on driving conditions of the internal combustion engine.

8. The control device of an internal combustion engine according to claim 1, further comprising:

power efficiency index mark calculating means for calculating a power efficiency index mark having correlation with power efficiency of the internal combustion engine;

index mark deviation calculating means for calculating a difference between said power efficiency index mark and a power efficiency index mark target value as an index mark deviation;

concentration deviation calculating means for calculating a difference between said NOx concentration estimated value and an NOx concentration target value as a concentration deviation;

evaluation value calculating means for calculating an evaluation value which becomes large as said index mark becomes big and becomes large as said concentration deviation becomes big; and ignition timing control means for controlling an ignition timing of the internal combustion engine so that said evaluation value becomes minimum.

9. The control device of an internal combustion engine according to claim 8, wherein said evaluation value calculating means reflects said index mark deviation and the concentration deviation to said evaluation value with ratios of their respective weighting factors, and said control device further comprises weighting factor changing means for changing said ratio of the weighting factors depending on a state of the internal combustion engine.

10. The control device of an internal combustion engine according to claim 9, further comprising:

a catalyst for purifying exhaust gas; and catalyst deterioration judgment means for determining deterioration of the catalyst, wherein said weighting factor changing means includes deterioration countermeasure means for enlarging the ratio of the weighting factor of the concentration deviation when the catalyst is judged to be deteriorated.

11. The control device of an internal combustion engine according to claim 9, further comprising:

a catalyst for purifying exhaust gas;

purification available capacity estimation means for estimating NOx purification available capacity of said catalyst;

reproducing means for executing a reproducing treatment to revitalize the NOx purification available capacity of said catalyst; and execution permission-prohibition determining means for determining permission or prohibition of execution of said reproducing treatment, wherein said weighting factor changing means includes reproduce impossibility countermeasure means for enlarging the ratio of the weighting factor of the concentration deviation when said NOx purification available capacity is equal to or less than a judgment value and the execution of said reproducing treatment is prohibited.

12. The control device of an internal combustion engine according to claim 1, further comprising:
   power efficiency index mark calculating means for calculating a power efficiency index mark that has correlation with power efficiency of the internal combustion engine;
   concentration deviation calculating means for calculating the deviation between the NOx concentration estimated value and a NOx concentration target value as a concentration deviation;
   index mark target value setting means for setting a power efficiency index mark target value by correcting a basic target value of said power efficiency index mark based on said concentration deviation; and
   ignition timing control means for controlling an ignition timing of the internal combustion engine so that said power efficiency index mark approaches said power efficiency index mark target value.

13. The control device of an internal combustion engine according to claim 1, further comprising:
   a variable valve timing mechanism which can change an opening characteristic of at least one of an intake valve and an exhaust valve so that valve overlap period changes; and
   control means for controlling said variable valve timing mechanism so that said NOx concentration estimated value approaches an NOx concentration target value.

14. The control device of an internal combustion engine, comprising:
   a cylinder internal pressure sensor detecting a cylinder internal pressure of the internal combustion engine;
   internal energy correlation value calculating means for calculating an internal energy correlation value having correlation with internal energy consumed in the cylinder based on the cylinder internal pressure;
   NOx concentration estimation means for calculating an NOx concentration estimated value in exhaust gas based on the internal energy correlation value; and
   a revolution number sensor which detects an engine revolution number,
   wherein said internal energy correlation value calculating means comprises:
   first calculating means for calculating said internal energy correlation value based on a result obtained by integrating a product of an in-cylinder volume and a change rate of the cylinder internal pressure per crank angle during an expansion stroke;
   second calculating means for calculating said internal energy correlation value based on a difference between a product of an in-cylinder volume and a cylinder internal pressure obtained shortly after a beginning of an expansion stroke and a product of an in-cylinder volume and a cylinder internal pressure obtained in a vicinity of an end of the expansion stroke; and
   calculation technique selecting means for selecting the calculation by the first calculating means when the engine revolution number is equal to or less than a judgment value and selecting the calculation by the second calculating means when the engine revolution number excesses the judgment value,
   wherein the judgment value is set as an upper limit until which it is possible to calculate the NOx concentration according to the calculation result by the first calculating means.

15. The control device of an internal combustion engine according to claim 1, further comprising:
   NOx concentration sensor for detecting an NOx concentration in exhaust-gas; and
   abnormality judgment means for judging an abnormality of said NOx concentration sensor when the difference between the detected value of said NOx concentration and said NOx concentration estimated value exceeds a judgment value.

16. The control device of an internal combustion engine according to claim 1 wherein
   said internal combustion engine has a plurality of cylinders;
   said cylinder internal pressure sensor is provided to each of said plurality of cylinders;
   said internal energy correlation value calculating means calculates said internal energy correlation value for each of said plurality of cylinders;
   said NOx concentration estimation means calculates said NOx concentration estimated value for each of said plurality of cylinders; and
   said control device further comprises right or wrong judgment means for judging that the estimated result of the NOx concentration estimated value is right when dispersion of the NOx concentration estimated values calculated for said plurality of cylinders is within a predetermined range.

* * * * *